(12) United States Patent
Liu et al.

(10) Patent No.: US 9,723,521 B2
(45) Date of Patent: Aug. 1, 2017

(54) NETWORK HANDOVER METHOD, TERMINAL, CONTROLLER, GATEWAY, AND SYSTEM

(71) Applicant: Huawei Technologies Co., Ltd., Shenzhen (CN)

(72) Inventors: Gang Liu, Shenzhen (CN); Jia Wan, Shenzhen (CN); Xihua Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 14/487,583

(22) Filed: Sep. 16, 2014

(65) Prior Publication Data

US 2015/0023321 A1    Jan. 22, 2015

Related U.S. Application Data

(63) Continuation of application No. PCT/CN2014/070879, filed on Jan. 20, 2014.

(30) Foreign Application Priority Data

Jun. 21, 2013   (CN) .......................... 2013 1 0250714

(51) Int. Cl.
*H04W 36/00* (2009.01)
*H04W 80/06* (2009.01)
(Continued)

(52) U.S. Cl.
CPC ..... *H04W 36/0016* (2013.01); *H04L 61/6077* (2013.01); *H04L 69/16* (2013.01); *H04W 80/06* (2013.01); *H04W 88/16* (2013.01)

(58) Field of Classification Search
CPC ......... H04L 29/08; H04L 29/12; H04L 67/10; H04W 36/00; H04W 36/0016
See application file for complete search history.

(56) References Cited

U.S. PATENT DOCUMENTS 7,009,952 B1   3/2006  Razavilar et al.
7,154,869 B2  12/2006  Guo et al.
(Continued)

FOREIGN PATENT DOCUMENTS

CN    1813445 A    8/2006
CN  101006703 A    7/2007
(Continued)

OTHER PUBLICATIONS

Partial English Translation and Abstract of Chinese Patent Application No. CN101917744A, Nov. 24, 2014, 25 pages.
(Continued)

*Primary Examiner* — Anez Ebrahim
(74) *Attorney, Agent, or Firm* — Conley Rose, P.C.

(57) ABSTRACT

A network handover method, a terminal, a controller, a gateway, and a system. The method includes: when a terminal accesses a first network, converting data including an initial TCP four-tuple into data including a first TCP four-tuple, and sending the data to a gateway; and after handing over from the first network to a second network, converting data including the initial TCP four-tuple into data including a second TCP four-tuple, and sending the data including the second TCP four-tuple to the gateway. This achieves objectives of preventing a connection from being interrupted before and after the network handover, improving use experience, and reducing complexity of a network handover process.

16 Claims, 15 Drawing Sheets

(51) Int. Cl.
     *H04W 88/16* (2009.01)
     *H04L 29/12* (2006.01)
     *H04L 29/06* (2006.01)

(56) References Cited

U.S. PATENT DOCUMENTS

| | | |
|---|---|---|
| 7,426,178 B2 | 9/2008 | Guo et al. |
| 7,826,426 B1 | 11/2010 | Bharghavan et al. |
| 8,493,931 B1 | 7/2013 | Nix |
| 8,699,466 B2 | 4/2014 | Kim et al. |
| 2002/0191627 A1 | 12/2002 | Subbiah et al. |
| 2006/0009228 A1* | 1/2006 | Kang .................... H04W 36/20 455/450 |
| 2006/0034211 A1* | 2/2006 | Kojima ............. H04L 29/06027 370/328 |
| 2006/0291419 A1 | 12/2006 | McConnell et al. |
| 2007/0030826 A1 | 2/2007 | Zhang et al. |
| 2007/0230401 A1 | 10/2007 | Rayzman et al. |
| 2009/0279506 A1 | 11/2009 | Sinnreich et al. |
| 2009/0285175 A1 | 11/2009 | Nix |
| 2010/0128696 A1 | 5/2010 | Fantini et al. |
| 2010/0150105 A1 | 6/2010 | Miao et al. |
| 2011/0149871 A1 | 6/2011 | Liu et al. |
| 2012/0113956 A1 | 5/2012 | Kim et al. |
| 2012/0281673 A1 | 11/2012 | Nix |
| 2013/0084873 A1* | 4/2013 | Sharony ................ H04W 36/14 455/438 |

FOREIGN PATENT DOCUMENTS

| | | |
|---|---|---|
| CN | 101064916 A | 10/2007 |
| CN | 101146319 A | 3/2008 |
| CN | 101175035 A | 5/2008 |
| CN | 101340722 A | 1/2009 |
| CN | 101563949 A | 10/2009 |
| CN | 101917744 A | 12/2010 |
| CN | 101965030 A | 2/2011 |
| CN | 102860081 A | 1/2013 |
| CN | 103067533 A | 4/2013 |
| CN | 103338488 A | 10/2013 |
| JP | 2012253680 A | 12/2012 |
| WO | 2005076651 A1 | 8/2005 |

OTHER PUBLICATIONS

Partial English Translation and Abstract of Chinese Patent Application No. CN1813445A, Nov. 24, 2014, 33 pages.
Partial English Translation and Abstract of Chinese Patent Application No. CN101064916A, Nov. 24, 2014, 10 pages.
Partial English Translation and Abstract of Chinese Patent Application No. CN101146319A, Nov. 24, 2014, 31 pages.
Partial English Translation and Abstract of Chinese Patent Application No. CN101175035A, Nov. 24, 2014, 3 pages.
Partial English Translation and Abstract of Chinese Patent Application No. CN101965030A, Nov. 24, 2014, 9 pages.
Partial English Translation and Abstract of Chinese Patent Application No. CN103067533A, Sep. 11, 2014, 16 pages.
Partial English Translation and Abstract of Chinese Patent Application No. CN103338488A, Sep. 11, 2014, 2 page.
Foreign Communication From a Counterpart Application, PCT Application No. PCT/CN2014/070879, International Search Report dated Apr. 21, 2014, 7 pages.
Foreign Communication From a Counterpart Application, PCT Application No. PCT/CN2014/070879, Written Opinion dated Apr. 21, 2014, 9 pages.

* cited by examiner

| When a terminal accesses a first network, the terminal converts data including an initial Transmission Control Protocol TCP four-tuple into data including a first TCP four-tuple, and sends the data including the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device | 102 |

| When the terminal hands over from the first network to a second network, the terminal sends a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple | 104 |

| The terminal converts data including the initial TCP four-tuple into data including the second TCP four-tuple, and sends the data including the second TCP four-tuple to the gateway, so that the gateway forwards the data including the second TCP four-tuple to the target device according to the second forward mapping information | 106 |

FIG. 3

When a terminal accesses a first network, a controller sends first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device ⟶ 302

When the terminal hands over from the first network to a second network, the controller receives a network handover notification sent by the terminal ⟶ 304

The controller generates second forward mapping information according to the network handover notification, and sends the second forward mapping information to the gateway, so that the gateway forwards data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including an initial TCP four-tuple ⟶ 306

FIG. 5

When a terminal accesses a first network, a gateway receives first forward mapping information sent by a controller, and forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device ~502

After the terminal hands over from the first network to a second network, the gateway receives second forward mapping information sent by the controller, and forwards data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple ~504

FIG. 7

When a network currently accessed by a terminal is a first network, a gateway receives first forward mapping information sent by a controller, and forwards data that is sent by the terminal and includes a first TCP four-tuple to a target device according to the first forward mapping information ~602

After the terminal hands over from the first network to a second network, the gateway receives second forward mapping information sent by the controller, and forwards data that is sent by the terminal and includes a second TCP four-tuple to the target device according to the second forward mapping information ~604

FIG. 8

NETWORK HANDOVER METHOD, TERMINAL, CONTROLLER, GATEWAY, AND SYSTEM

CROSS-REFERENCE TO RELATED APPLICATIONS

This application is a continuation of International Application No. PCT/CN2014/070879, filed on Jan. 20, 2014, which claims priority to Chinese Patent Application No. 201310250714.3, filed on Jun. 21, 2013, both of which are hereby incorporated by reference in their entireties.

TECHNICAL FIELD

The present invention relates to the field of mobile communications, and in particular, to a network handover method, a terminal, a controller, a gateway, and a system.

BACKGROUND

With the continuous development of the field of mobile communications, abundant mobile network resources, for example, third generation (3G), wireless fidelity (WiFi), and Worldwide Interoperability for Microwave Access (WiMAX), exist around us. Because a terminal can use only one type of network at a time, when the terminal hands over from one type of network to another type of network, a connection to a network that is currently used is interrupted, which affects use experience. Therefore, the user urgently requires a network handover method that may perform a seamless handover.

Referring to FIG. 1, which shows a schematic structural diagram of a network provided by the prior art of the present invention. Using that a terminal hands over from a first network that is currently used to a second network as an example, an existing network handover method is as follows: (1) The terminal, when detecting that the terminal enters an overlapping coverage area of a base station of the first network and a base station of the second network, establishes a data-layer connection to the base station of the second network, and sends a handover request signal to the base station of the second network; (2) the base station of the first network, the base station of the second network, and a gateway perform a handover procedure according to the Media Independent Handover protocol, so that the gateway may provide a service for the terminal using the base station of the second network; (3) the base station of the first network and the base station of the second network perform frame synchronization using the gateway; (4) the base station of the second network returns a handover completion indication to the terminal, so that the terminal receives a service using the base station of the second network; and (5) the base station of the first network and the gateway retain a connection to the first network, so that the terminal may be handed over from the second network back to the first network later.

During implementation of the present invention, the inventor finds that the prior art has at least the following problems:

In the existing network handover method, after a base station of a first network, a base station of a second network, and a gateway perform a handover procedure according to the Media Independent Handover protocol, the base station of the first network and the base station of the second network must perform frame synchronization using the gateway; however, a process of the frame synchronization needs to take a long period of time, which usually affects normal use by a user and increases complexity of a network handover process.

SUMMARY

In order to solve, to a certain extent, a problem in the prior art that a base station of a first network and a base station of a second network must perform frame synchronization using a gateway, embodiments of the present invention provide a network handover method, a terminal, a controller, a gateway, and a system. The technical solutions are as follows:

According to a first aspect, a network handover method is provided, where the method includes when a terminal accesses a first network, converting, by the terminal, data including an initial Transmission Control Protocol (TCP) four-tuple into data including a first TCP four-tuple, and sending the data including the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device; when the terminal hands over from the first network to a second network, sending, by the terminal, a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple; and converting, by the terminal, data including the initial TCP four-tuple into data including the second TCP four-tuple, and sending the data including the second TCP four-tuple to the gateway, so that the gateway forwards the data including the second TCP four-tuple to the target device according to the second forward mapping information.

In a first possible implementation manner of the first aspect, the terminal has an initial Internet Protocol (IP) address, a first network IP address, and a second network IP address, where in the initial TCP four-tuple, a source IP address is the initial IP address and a destination IP address is an IP address of the target device; in the first TCP four-tuple, a source IP address is the first network IP address and a destination IP address is the IP address of the target device; in the second TCP four-tuple, a source IP address is the second network IP address and a destination IP address is the IP address of the target device; and in the destination TCP four-tuple, a source IP address is an IP address of the gateway and a destination IP address is the IP address of the target device.

With reference to the first possible implementation manner of the first aspect, in a second possible implementation manner of the first aspect, before the converting, by the terminal, data including an initial TCP four-tuple into data including a first TCP four-tuple, and sending the data including the first TCP four-tuple to a gateway, the method further includes sending, by the terminal, registration information to the controller, where the registration information includes the first network IP address, so that the controller generates the first forward mapping information according to the first network IP address and sends the first forward mapping information.

With reference to the first aspect, the first possible implementation manner of the first aspect, or the second possible implementation manner of the first aspect, in a third possible implementation manner of the first aspect, before the sending, by the terminal, a network handover notification to the controller, the method further includes detecting, by the terminal, whether a first handover condition is met; and when the first handover condition is met, handing over, by the terminal, from the first network to the second network, where the first handover condition includes at least one of the following four conditions: the terminal leaves a coverage area of the first network; or the terminal enters a coverage area of the second network; or a connection situation of the second network is better than that of the first network; or the terminal is directed to use the second network first.

With reference to the first aspect, the first possible implementation manner of the first aspect, or the second possible implementation manner of the first aspect, in a fourth possible implementation manner of the first aspect, before the sending, by the terminal, a network handover notification to the controller, the method further includes receiving, by the terminal, a handover indication sent by the controller, where the handover indication is an indication that is sent by the controller when the controller detects that a second handover condition is met; and the sending, by the terminal, a network handover notification to the controller includes sending, by the terminal, the network handover notification to the controller according to the handover indication, where the second handover condition includes at least one of the following two conditions: a connection situation of the second network is better than that of the first network; or a network utilization rate of the second network is lower than a network utilization rate of the first network.

According to a second aspect, a network handover method is provided, where the method includes when a terminal accesses a first network, sending, by a controller, first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; when the terminal hands over from the first network to a second network, receiving, by the controller, a network handover notification sent by the terminal; and generating, by the controller, second forward mapping information according to the network handover notification, and sending the second forward mapping information to the gateway, so that the gateway forwards data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

In a first possible implementation manner of the second aspect, in the initial TCP four-tuple, a source IP address is an initial IP address of the terminal and a destination IP address is an IP address of the target device; in the first TCP four-tuple, a source IP address is a first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

With reference to the first possible implementation manner of the second aspect, in a second possible implementation manner of the second aspect, before the sending, by a controller, first forward mapping information to a gateway, the method further includes receiving, by the controller, registration information sent by the terminal, where the registration information includes the first network IP address of the terminal; receiving, by the controller, a first forward mapping information obtaining request sent by the gateway, where the first forward mapping information obtaining request includes the IP address of the target device; and generating, by the controller, the first forward mapping information according to the first network IP address and the IP address of the target device, and sending the first forward mapping information to the gateway.

With reference to the second aspect, the first possible implementation manner of the second aspect, or the second possible implementation manner of the second aspect, in a third possible implementation manner of the second aspect, before the receiving, by the controller, a network handover notification sent by the terminal, the method further includes detecting, by the controller, whether a second handover condition is met; and when the second handover condition is met, sending, by the controller, a handover indication to the terminal, so that the terminal sends the network handover notification according to the handover indication, where the second handover condition includes at least one of the following two conditions: a connection situation of the second network is better than that of the first network; or a network utilization rate of the second network is lower than a network utilization rate of the first network.

With reference to the second possible implementation manner of the second aspect, in a fourth possible implementation manner of the second aspect, the network handover notification includes the second network IP address of the terminal, where the generating, by the controller, second forward mapping information according to the network handover notification includes changing, by the controller, the first network IP address in the first forward mapping information to the second network IP address, and using the changed forward mapping information as the second forward mapping information.

According to a third aspect, a network handover method is provided, where the method includes when a terminal accesses a first network, receiving, by a gateway, first forward mapping information sent by a controller, and forwarding data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; after the terminal hands over from the first network to a second network, receiving, by the gateway, second forward mapping information sent by the controller, and forwarding data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

In a first possible implementation manner of the third aspect, in the initial TCP four-tuple, a source IP address is an initial IP address of the terminal and a destination IP address is an IP address of the target device. In the first TCP four-tuple, a source IP address is a first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

With reference to the third aspect or the first possible implementation manner of the third aspect, in a second possible implementation manner of the third aspect, before the receiving, by a gateway, first forward mapping information sent by a controller, the method further includes receiving, by the gateway, a first data packet of the data that is sent by the terminal and includes the first TCP four-tuple; detecting, by the gateway, whether the first forward mapping information exists; and when the first forward mapping information does not exist, sending, by the gateway, a first forward mapping information obtaining request to the controller, where the first forward mapping information obtaining request includes the IP address of the target device, so that the controller generates the first forward mapping information according to the IP address of the target device.

According to a fourth aspect, a terminal is provided, where the terminal includes a first data converting module configured to when the terminal accesses a first network, convert data including an initial TCP four-tuple into data including a first TCP four-tuple; a first data sending module configured to send the data that is converted by the first data converting module and includes the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device; a handover notification sending module configured to when the terminal hands over from the first network to a second network, send a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple; a second data converting module configured to convert data including the initial TCP four-tuple into data including the second TCP four-tuple; and a second data sending module configured to send the data that is converted by the second data converting module and includes the second TCP four-tuple to the gateway, so that the gateway forwards the data including the second TCP four-tuple to the target device according to the second forward mapping information.

In a first possible implementation of the fourth aspect, the terminal further includes a registration information sending module configured to before the first data converting module converts the data including the initial TCP four-tuple into the data including the first TCP four-tuple, send registration information to the controller, where the registration information includes a first network IP address, so that the controller generates the first forward mapping information according to the first network IP address; where the terminal includes an initial IP address, the first network IP address, and a second network IP address. In the initial TCP four-tuple, a source IP address is the initial IP address and a destination IP address is an IP address of the target device; in the first TCP four-tuple, a source IP address is the first network IP address and a destination IP address is the IP address of the target device; in the second TCP four-tuple, a source IP address is the second network IP address and a destination IP address is the IP address of the target device; and in the destination TCP four-tuple, a source IP address is an IP address of the gateway and a destination IP address is the IP address of the target device.

With reference to the fourth aspect or the first possible implementation manner of the fourth aspect, in a second possible implementation manner of the fourth aspect, the terminal further includes a first condition detecting module configured to before the handover notification sending module sends the network handover notification to the controller, detect whether a first handover condition is met; and when the first condition detecting module detects that the first handover condition is met, determine to hand over the terminal from the first network to the second network, where the first handover condition includes at least one of the following four conditions: the terminal leaves a coverage area of the first network; or the terminal enters a coverage area of the second network; or a connection situation of the second network is better than that of the first network; or the terminal is directed to use the second network first.

With reference to the fourth aspect or the first possible implementation manner of the fourth aspect, in a third possible implementation manner of the fourth aspect, the terminal further includes a handover indication receiving module configured to before the handover notification sending module sends the network handover notification to the controller, receive a handover indication sent by the controller, where the handover indication is an indication that is sent by the controller when the controller detects that a second handover condition is met, where the handover notification sending module is configured to send the network handover notification to the controller according to the handover indication received by the handover indication receiving module; and the second handover condition includes at least one of the following two conditions: a connection situation of the second network is better than that of the first network; or a network utilization rate of the second network is lower than a network utilization rate of the first network.

According to a fifth aspect, a controller is provided, where the controller includes a first mapping sending module configured to when a terminal accesses a first network, send first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; a handover notification receiving module configured to when the terminal hands over from the first network to a second network, receive a network handover notification sent by the terminal; a second mapping generating module configured to generate second forward mapping information according to the network handover notification received by the handover notification receiving module; and a second mapping sending module configured to send the second forward mapping information generated by the second mapping generating module to the gateway, so that the gateway forwards data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

In a first possible implementation manner of the fifth aspect, the controller further includes a registration information receiving module configured to before the first mapping sending module sends the first forward mapping information to the gateway, receive registration information sent by the terminal, where the registration information includes a first network IP address of the terminal; a request receiving module configured to receive a first forward mapping information obtaining request sent by the gateway, where the first forward mapping information obtaining request includes an IP address of the target device; and a first mapping generating module configured to generate the first forward mapping information according to the first network IP address and the IP address of the target device, and send the first forward mapping information to the gateway, where in the initial TCP four-tuple, a source IP address is an initial IP address of the terminal and a destination IP address is the IP address of the target device. In the first TCP four-tuple, a source IP address is the first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

With reference to the fifth aspect or the first possible implementation manner of the fifth aspect, in a second possible implementation manner of the fifth aspect, the controller further includes a second condition detecting module configured to before the handover notification receiving module receives the network handover notification sent by the terminal, detect whether a second handover condition is met; and a handover indication sending module configured to when the second condition detecting module detects that the second handover condition is met, send a handover indication to the terminal, so that the terminal sends the network handover notification according to the handover indication, where the second handover condition includes at least one of the following two conditions: a connection situation of the second network is better than that of the first network; or a network utilization rate of the second network is lower than a network utilization rate of the first network.

With reference to the first possible implementation manner of the fifth aspect, in a third possible implementation manner of the fifth aspect, the second mapping generating module is configured to change the first network IP address in the first forward mapping information into the second network IP address, and use changed forwarding mapping as the second forward mapping information, where the network handover notification includes the second network IP address of the terminal.

In a sixth aspect, a gateway is provided, where the gateway includes a first mapping receiving module configured to when a terminal accesses a first network, receive first forward mapping information sent by a controller; a first forwarding module configured to forward data that is sent by the terminal and includes a first TCP four-tuple to a target device according to the first forward mapping information received by the first mapping receiving module, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; a second mapping receiving module configured to when the terminal hands over from the first network to a second network, receive second forward mapping information sent by the controller; and a second forwarding module configured to forward data that is sent by the terminal and includes a second TCP four-tuple to the target device according to the second forward mapping information received by the second mapping receiving module, where the second forward mapping information is a mapping relationship between the second TCP four-tuple and the destination TCP four-tuple, and the data including the second TCP four-tuple is data obtained after the terminal converts data including the initial TCP four-tuple.

In a first possible implementation manner of the sixth aspect, the gateway further includes a data packet receiving module configured to before the first mapping receiving module receives the first forward mapping information sent by the controller, receive a first data packet of the data that is sent by the terminal and includes the first TCP four-tuple; a forward mapping detecting module configured to detect whether the first forward mapping information exists; and a request sending module configured to when the forward mapping detecting module detects that the first forward mapping information does not exist, send a first forward mapping information obtaining request to the controller, where the first forward mapping information obtaining request includes an IP address of the target device, so that the controller generates the first forward mapping information according to the IP address of the target device; where in the initial TCP four-tuple, a source IP address is an initial IP address of the terminal and a destination IP address is the IP address of the target device. In the first TCP four-tuple, a source IP address is a first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

According to a seventh aspect, a network handover system is provided, where the system includes the terminal according to the fourth aspect, the controller according to the fifth aspect, and the gateway according to the sixth aspect.

The technical solutions provided by the embodiments of the present invention produce the following beneficial effects:

Before a network handover, a terminal converts data including an initial TCP four-tuple into data including a first TCP four-tuple and sends the data including the first TCP four-tuple to a gateway, and after the network handover, the terminal converts data including the initial TCP four-tuple into data including a second TCP four-tuple and sends the data including the second TCP four-tuple to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

FIG. 3 is a flowchart of a network handover method according to one embodiment of the present invention;

FIG. 5 is a flowchart of a network handover method according to one embodiment of the present invention;

FIG. 7 is a flowchart of a network handover method according to one embodiment of the present invention;

FIG. 8 is a flowchart of a network handover method according to another embodiment of the present invention;

DESCRIPTION OF EMBODIMENTS

To make the objectives, technical solutions, and advantages of the present invention clearer, the following further describes the embodiments of the present invention in detail with reference to the accompanying drawings.

Figure 1:
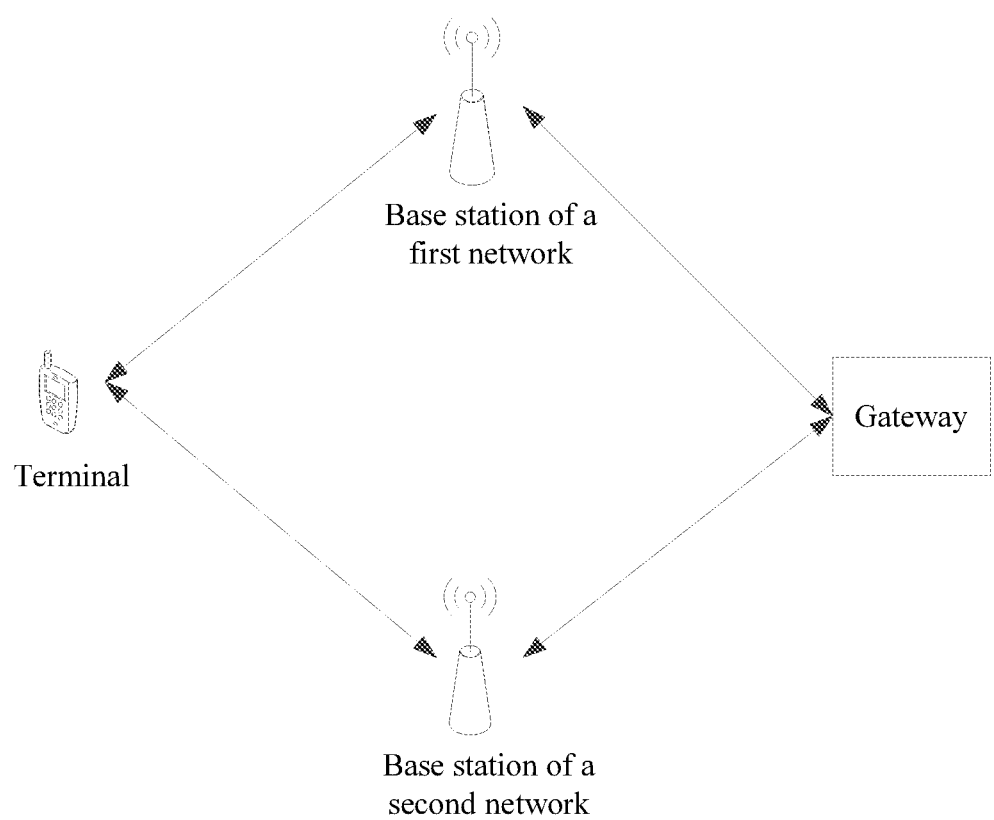
FIG. 1 is a schematic structural diagram of a network according to the prior art of the present invention.
Figure 2:
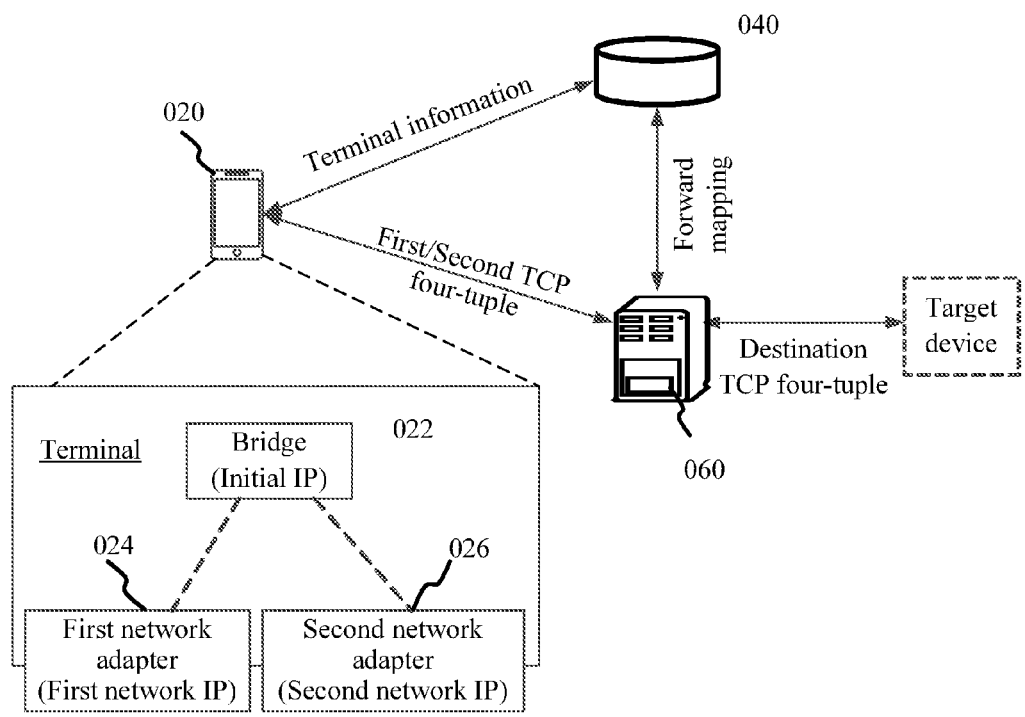
FIG. 2 is a schematic structural diagram of an implementing environment of a network handover method according to an embodiment of the present invention.

Referring to FIG. 2, which shows a schematic structural diagram of an implementing environment of a network handover method provided by an embodiment of the present invention. The implementing environment includes a terminal 020, a controller 040, and a gateway 060.

The terminal 020 includes a bridge 022, a first network adapter 024, and a second network adapter 026. The bridge 022 may be a physical bridge, a virtual bridge, or another virtual apparatus having a function of a bridge. The first network adapter 024 is a network adapter corresponding to a first network; the second network adapter 026 is a network adapter corresponding to a second network; the first network adapter 024 and the second network adapter 026 are separately connected to the bridge 022; an IP address of the bridge 022 is an initial IP address; an IP address of the first network adapter 024 is a first network IP address; and an IP address of the second network adapter 026 is a second network IP address. When a network adapter currently used by the terminal to receive and send data is the first network adapter 024, the terminal first sends to the bridge 022, according to an initial TCP four-tuple (initial IP address, port of the terminal, IP address of a target device, port of the target device), data to be sent to the target device; then, the first network adapter 024 converts the data into data including a first TCP four-tuple (first network IP address, port of the terminal, IP address of the target device, port of the target device) and sends the data including the first TCP four-tuple to the gateway 060. When a network adapter currently used by the terminal to receive and send data is the second network adapter 026, the terminal first sends to the bridge 022, according to the initial TCP four-tuple (initial IP address, port of the terminal, IP address of the target device, port of the target device), the data to be sent to the target device; then, the second network adapter 026 converts the data into data including a second TCP four-tuple (second network IP address, port of the terminal, IP address of the target device, port of the target device) and sends the data including the second TCP four-tuple to the gateway 060. In addition, the terminal 020 further sends terminal information, such as the first network IP address, the second network IP address, and the port of the terminal, to the controller 040.

The controller 040 is configured to receive and store the terminal information sent by the terminal 020; and when the gateway 060 requests forward mapping, generate forward mapping information including a mapping relationship between the first/second TCP four-tuple and a destination TCP four-tuple (IP address of the gateway, port of the gateway, IP address of the target device, port of the target device) according to the stored terminal information, and send the forward mapping information to the gateway 060.

The gateway 060 is configured to send, according to the destination TCP four-tuple in the forward mapping information sent by the controller 040, the data that is sent by the terminal and includes the first/second TCP four-tuple to the target device.

Referring to FIG. 3, which shows a flowchart of a network handover method provided by one embodiment of the present invention. The network handover method is applicable to the terminal shown in FIG. 2. The network handover method may include:

Step 102: When a terminal accesses a first network, the terminal converts data including an initial TCP four-tuple into data including a first TCP four-tuple, and sends the data including the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device.

Step 104: When the terminal hands over from the first network to a second network, the terminal sends a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple.

Step 106: After the terminal hands over from the first network to the second network, the terminal converts data including the initial TCP four-tuple into data including the second TCP four-tuple, and sends the data including the second TCP four-tuple to the gateway, so that the gateway forwards the data including the second TCP four-tuple to the target device according to the second forward mapping information.

According to the foregoing description, in the network handover method provided by the embodiment of the present invention, a terminal, before a network handover, converts data including an initial TCP four-tuple into data including a first TCP four-tuple and sends the data including the first TCP four-tuple to a gateway, and after the network handover, converts data including the initial TCP four-tuple into data including a second TCP four-tuple and sends the data including the second TCP four-tuple to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 4:
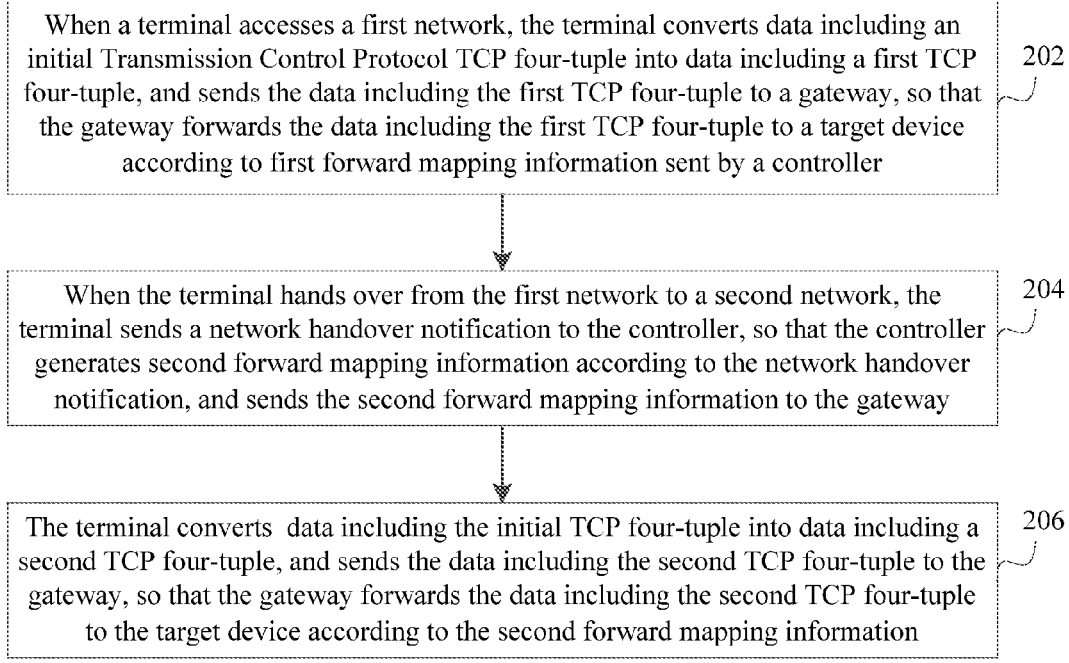
FIG. 4 is a flowchart of a network handover method according to another embodiment of the present invention.

For a more exemplary solution based on the network handover method shown in FIG. 3, refer to FIG. 4, which shows a flowchart of a network handover method provided by another embodiment of the present invention. The network handover method is applicable to the terminal shown in FIG. 2, and the method may include:

Step 202: When a terminal accesses a first network, the terminal converts data including an initial TCP four-tuple into data including a first TCP four-tuple, and sends the data including the first TCP four-tuple to a gateway, so that the gateway forwards the data including the first TCP four-tuple to a target device according to first forward mapping information sent by a controller.

A destination TCP four-tuple is a TCP four-tuple corresponding to the target device.

The terminal has an initial IP address, a first network IP address, and a second network IP address. The first forward mapping information includes a mapping relationship between the first TCP four-tuple and the destination TCP four-tuple. In the initial TCP four-tuple, a source IP address is the initial IP address and a destination IP address is an IP address of the target device; in the first TCP four-tuple, a source IP address is the first network IP address and a destination IP address is the IP address of the target device.

When the terminal receives and sends data using the first network, the terminal converts the data including the initial TCP four-tuple into the data including the first TCP four-tuple, and sends the data including the first TCP four-tuple to the gateway.

In addition, before the terminal converts the data including the initial TCP four-tuple into the data including the first TCP four-tuple and sends the data including the first TCP four-tuple to the gateway, the terminal sends registration information to the controller, where the registration information includes the first network IP address, so that the controller generates the first forward mapping information according to the first network IP address, and sends the first forward mapping information to the gateway.

Step 204: When the terminal hands over from the first network to a second network, the terminal sends a network handover notification to the controller, so that the controller generates second forward mapping information according to the network handover notification, and sends the second forward mapping information to the gateway.

The second forward mapping information generated by the controller includes a mapping relationship between a second TCP four-tuple and the destination TCP four-tuple. In the second TCP four-tuple, a source IP address is the second network IP address and a destination IP address is the IP address of the target device.

In addition, before sending the network handover notification to the controller, the terminal first detects whether a first handover condition is met; when the first handover condition is met, the terminal hands over from the first network to the second network, and performs the step of sending the network handover notification to the controller. The first handover condition may include at least one of the following conditions: the terminal leaves a coverage area of the first network; or the terminal enters a coverage area of the second network; or a connection situation of the second network is better than that of the first network; or the terminal (or an application program using a data service in the terminal) is directed to use the second network first.

In addition, before sending the network handover notification to the controller, the terminal may further receive a handover indication sent by the controller, and then send the network handover notification to the controller according to the handover indication, where the handover indication is an indication that is sent by the controller when the controller detects that a second handover condition is met, and the second handover condition includes one or two of the conditions that a connection situation of the second network is better than that of the first network or a network utilization rate of the second network is lower than a network utilization rate of the first network.

Step 206: The terminal converts data including the initial TCP four-tuple into data including the second TCP four-tuple, and sends the data including the second TCP four-tuple to the gateway, so that the gateway forwards the data including the second TCP four-tuple to the target device according to the second forward mapping information.

After handing over from the first network to the second network, the terminal converts the data including the initial TCP four-tuple into the data including the second TCP four-tuple, and sends the data including the second TCP four-tuple to the gateway.

Further, a TCP connection is determined using a TCP four-tuple that comprises a source IP address address, a destination IP address address, a source port number, and a destination port number. The TCP connection is not interrupted as long as a four-tuple at two ends (a sender and a receiver) of the TCP connection remains unchanged. In the method provided by this embodiment of the present invention, the terminal has the initial IP address, the first network IP address, and the second network IP address, where the initial IP address may be an IP address of a virtual bridge, the first network IP address may be an IP address of a network adapter corresponding to the first network, and the second network IP address may be an IP address of a network adapter corresponding to the second network. When sending data to the target device using the first network, the terminal first sends the data to a bridge according to the initial TCP four-tuple (initial IP address, port of the terminal, IP address of the target device, port of the target device); then, the bridge sends the data to the gateway according to the first TCP four-tuple (first network IP address, port of the terminal, IP address of the target device, port of the target device).

When the bridge in the terminal receives a first data packet that is sent according to the initial TCP four-tuple, the terminal sends registration information to the controller, where the registration information includes terminal information, for example, the first network IP address, a port number of the terminal, an identity of the terminal, and the like, so that the controller generates, according to the registration information, the first forward mapping information used to forward the data, which is sent according to the first TCP four-tuple, to the target device.

When the terminal detects that the first handover condition is met, or the terminal receives a handover indication sent by the controller, the terminal sends the network handover notification to the controller, where the network handover notification includes the second network IP address of the terminal. The terminal sends data to the target device using the second network after sending the network handover notification to the controller. Further, the data is first sent to the bridge according to the initial TCP four-tuple; then, the bridge sends the data to the gateway according to the second TCP four-tuple (second network IP address, port of the terminal, IP address of the target device, port of the target device); and the gateway forwards, according to the second forward mapping information that is generated according to the second network IP address in the network handover notification and sent by the controller, the data, which is sent by the terminal according to the second TCP four-tuple, to the target device.

According to the foregoing description, in the network handover method provided by the embodiment of the present invention, before a network handover, data including an initial TCP four-tuple is converted into data including a first TCP four-tuple to send to a gateway, and after the network handover, data including the initial TCP four-tuple is converted into data including a second TCP four-tuple to send to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, in network handover method provided by the embodiment of the present invention, a handover notification is sent to a controller only when it is detected that a first handover condition is met or a handover indication sent by the controller is received. This solves a problem in the prior art that the handover is performed once the terminal enters an overlapping coverage area of the first network and the second network, and achieves objectives of performing the network handover on the terminal in a controlled manner, selecting an optimal network connection solution, optimizing a network utilization rate, and reducing network handover frequency.

Referring to FIG. 5, which shows a flowchart of a network handover method provided by one embodiment of the present invention. The network handover method is applicable to the controller shown in FIG. 2, and the method may include:

Step 302: When a terminal accesses a first network, a controller sends first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device.

Step 304: When the terminal hands over from the first network to a second network, the controller receives a network handover notification sent by the terminal.

Step 306: The controller generates second forward mapping information according to the network handover notification, and sends the second forward mapping information to the gateway, so that the gateway forwards, after the terminal hands over from the first network to the second network, data that is sent by the terminal and includes a second TCP four-tuple to the target device according to the second forward mapping information, where the second forward mapping information includes a mapping relationship between the second TCP four-tuple and the destination TCP four-tuple, and the data including the second TCP four-tuple is data obtained after the terminal converts data including the initial TCP four-tuple.

According to the foregoing description, in the method provided by the embodiment of the present invention, before a terminal performs a network handover, first forward mapping information is generated for a gateway, so that the gateway forwards data which includes a first TCP four-tuple and is obtained by the terminal by converting data including an initial TCP four-tuple to a target device; after the terminal performs the network handover, second forward mapping information is generated for the gateway, so that the gateway forwards data which includes a second TCP four-tuple and is obtained by the terminal by converting data including the initial TCP four-tuple to the target device according to the second forward mapping information; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 6:
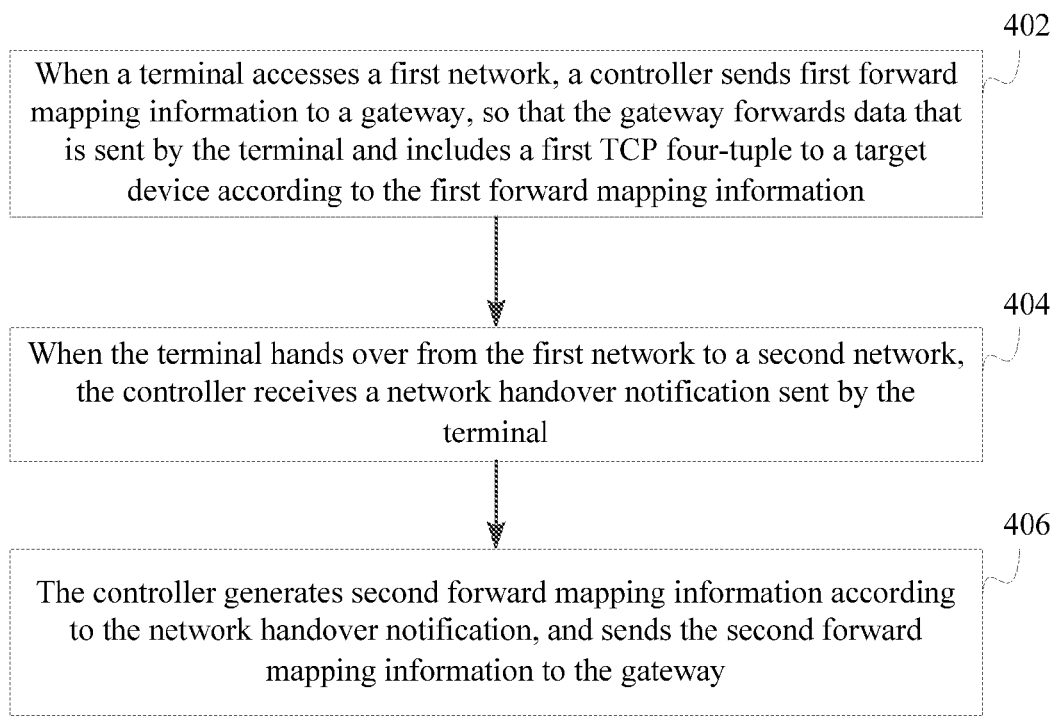
FIG. 6 is a flowchart of a network handover method according to another embodiment of the present invention.

For a more exemplary method based on the network handover method shown in FIG. 5, refer to FIG. 6, which shows a flowchart of a network handover method provided by another embodiment of the present invention. The network handover method may be applicable to the controller shown in FIG. 2, and the method may include:

Step 402: When a terminal accesses a first network, a controller sends first forward mapping information to a gateway, so that the gateway forwards data that is sent by the terminal and includes a first TCP four-tuple to a target device according to the first forward mapping information.

The first forward mapping information includes a mapping relationship between the first TCP four-tuple and a destination TCP four-tuple. The data including the first TCP four-tuple is data obtained after the terminal converts data including an initial TCP four-tuple. The destination TCP four-tuple is a TCP four-tuple corresponding to the target device. In the initial TCP four-tuple, a source IP address is an initial IP address of the terminal and a destination IP address is an IP address of the target device; in the first TCP four-tuple, a source IP address is a first network IP address of the terminal and a destination IP address is the IP address of the target device; and in the destination TCP four-tuple, a source IP address is an IP address of the gateway and a destination IP address is the IP address of the target device.

Further, the terminal has the initial IP address, the first network IP address, and a second network IP address. When establishing a connection to the target device using the first network, the terminal sends registration information to the controller, where the registration information may include information such as the first network IP address of the terminal. When receiving a first data packet of the data that is sent by the terminal and includes the first TCP four-tuple, the gateway detects that no first forward mapping information for forwarding the data including the first TCP four-tuple is locally stored, and accordingly, sends a first forward mapping information obtaining request to the controller, where the request carries information such as the IP address of the target device. The controller generates the first forward mapping information according to the first network IP address of the terminal and the IP address of the target device.

Step 404: When the terminal hands over from the first network to a second network, the controller receives a network handover notification sent by the terminal.

A process for the terminal to perform network handover may be actively triggered by the terminal when the terminal detects that a first handover condition is met, or be triggered by the controller. When the controller triggers the terminal to perform the network handover, the controller detects whether a second handover condition is met, and when the second handover condition is met, sends a handover indication to the terminal, so that the terminal sends the network handover notification according to the handover indication, where the second handover condition includes one or two of the conditions that a connection situation of the second network is better than that of the first network or a network utilization rate of the second network is lower than a network utilization rate of the first network.

Step 406: The controller generates second forward mapping information according to the network handover notification, and sends the second forward mapping information to the gateway.

The controller sends the second forward mapping information to the gateway, so that the gateway forwards data that is sent by the terminal and includes a second TCP four-tuple to the target device according to the second forward mapping information.

The second forward mapping information is a mapping relationship between the second TCP four-tuple and the destination TCP four-tuple; the data including the second TCP four-tuple is data obtained after the terminal converts data including the initial TCP four-tuple; and in the second TCP four-tuple, a source IP address is the second network IP address of the terminal and a destination IP address is the IP address of the target device.

The network handover notification may include the second network IP address of the terminal. When receiving a first data packet of the data that is sent by the terminal and includes the second TCP four-tuple, the gateway detects that no second forward mapping information used to forward the data including the second TCP four-tuple is stored locally, and accordingly, sends a second forward mapping information obtaining request to the controller; the controller changes the first network IP address in the first forward mapping information into the second network IP address, and sends the changed forward mapping information as the second forward mapping information to the gateway.

According to the foregoing description, in the network handover method provided by the embodiment of the present invention, before a terminal performs a network handover, first forward mapping information is generated for a gateway, so that the gateway forwards data which includes a first TCP four-tuple and is obtained by the terminal by converting data including an initial TCP four-tuple, to a target device; after the terminal performs the network handover, second forward mapping information is generated for the gateway, so that the gateway forwards data which includes a second TCP four-tuple and is obtained by the terminal by converting data including the initial TCP four-tuple to the target device according to the second forward mapping information; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, in the network handover method provided by the embodiment of the present invention, a handover indication is sent to the terminal when it is detected that a second handover condition is met, so that the terminal sends a network handover notification according to the handover indication. This solves a problem in the prior art that the handover is performed once the terminal enters an overlapping coverage area of the first network and the second network, and achieves objectives of performing the network handover on the terminal in a controlled manner, selecting an optimal network connection solution, optimizing a network utilization rate, and reducing network handover frequency.

Referring to FIG. 7, which shows a flowchart of a network handover method provided by one embodiment of the present invention. The network handover method is applicable to the gateway shown in FIG. 2. The network handover method may include:

Step 502: When a terminal accesses a first network, a gateway receives first forward mapping information sent by a controller, and forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device.

Step 504: After the terminal hands over from the first network to a second network, the gateway receives second forward mapping information sent by the controller, and forwards data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

According to the foregoing description, in the network handover method provided by the embodiment of the present invention, a gateway, before a terminal performs a network handover, forwards data which includes a first TCP four-tuple and is obtained by the terminal by converting data including an initial TCP four-tuple, to a target device according to first forward mapping information sent by a controller; after the terminal performs the network handover, forwards data which includes a second TCP four-tuple and is obtained by the terminal by converting data including the initial TCP four-tuple to the target device according to second forward mapping information sent by the controller; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

For a more exemplary solution based on the network handover method shown in FIG. 7, refer to FIG. 8, which shows a flowchart of a network handover method provided by another embodiment of the present invention. The method may be applicable to the gateway shown in FIG. 2. The network handover method may include:

Step 602: When a network currently accessed by a terminal is a first network, a gateway receives first forward mapping information sent by a controller, and forwards data that is sent by the terminal and includes a first TCP four-tuple to a target device according to the first forward mapping information.

The first forward mapping information is a mapping relationship between the first TCP four-tuple and a destination TCP four-tuple; the data including the first TCP four-tuple is data obtained after the terminal converts data including an initial TCP four-tuple; the destination TCP four-tuple is a TCP four-tuple corresponding to the target device; in the initial TCP four-tuple, a source IP address is an initial IP address of the terminal and a destination IP address is an IP address of the target device; in the first TCP four-tuple, a source IP address is a first network IP address of the terminal and a destination IP address is the IP address of the target device; and in the destination TCP four-tuple, a source IP address is an IP address of the gateway and a destination IP address is the IP address of the target device.

Further, before the terminal performs a network handover, when receiving a first data packet of the data that is sent by the terminal and includes the first TCP four-tuple, and when detecting that no first forward mapping information for forwarding the data including the first TCP four-tuple is locally stored, the gateway sends a first forward mapping information obtaining request to the controller, where the first forward mapping information obtaining request includes the IP address of the target device. The controller generates the first forward mapping information according to the first network IP address included in registration information sent by the terminal to the controller and the IP address of the target device, and sends the first forward mapping information to the gateway; the gateway forwards the data that is sent by the terminal and includes the first TCP four-tuple to the target device according to the first forward mapping information.

Step 604: After the terminal hands over from the first network to a second network, the gateway receives second forward mapping information sent by the controller, and forwards data that is sent by the terminal and includes a second TCP four-tuple to the target device according to the second forward mapping information.

The second forward mapping information is a mapping relationship between the second TCP four-tuple and the destination TCP four-tuple; the data including the second TCP four-tuple is data obtained after the terminal converts data including the initial TCP four-tuple; and in the second TCP four-tuple, a source IP address is a second network IP address of the terminal and a destination IP address is the IP address of the target device.

Further, after the terminal hands over from the first network to the second network, when receiving a first data packet of the data that is sent by the terminal and includes the second TCP four-tuple, and when detecting that no second forward mapping information for forwarding the data including the second TCP four-tuple is locally stored, the gateway sends a second forward mapping information obtaining request to the controller; the controller changes the first network IP address in the first forward mapping information into the second network IP address included in the network handover notification sent by the terminal, and sends the changed forward mapping information as the second forward mapping information to the gateway; and the gateway forwards the data including the second TCP four-tuple to the target device according to the second forward mapping information.

According to the foregoing description, in the network handover method provided by the embodiment of the present invention, before a terminal performs a network handover, data which includes a first TCP four-tuple and is obtained by the terminal by converting data including an initial TCP four-tuple, is forwarded to a target device according to first forward mapping information sent by a controller; after the terminal performs the network handover, data which includes a second TCP four-tuple and is obtained by the terminal by converting data including the initial TCP four-tuple is forwarded to the target device according to second forward mapping information sent by the controller; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 9:
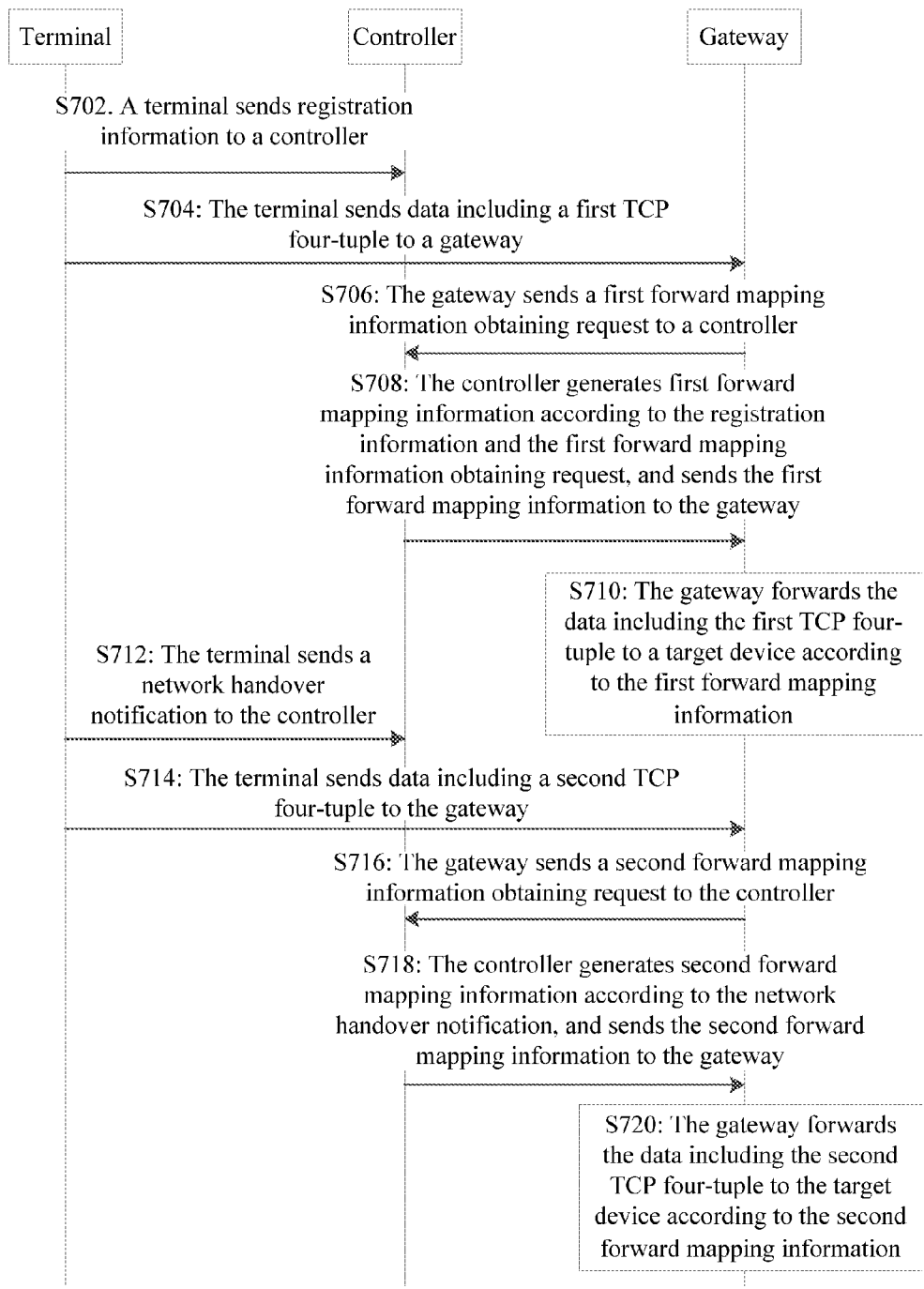
FIG. 9 is a flowchart of a network handover method according to one embodiment of the present invention.

Referring to FIG. 9, which shows a schematic flowchart of a network handover method provided by one embodiment of the present invention. The network handover method is applicable to a communications system including the terminal, the controller, and the gateway that are shown in FIG. 2. In an example that a network adapter currently used by a terminal to receive and send data is a first network adapter, the network handover method may include:

Step 702: A terminal sends registration information to a controller.

The terminal sends the registration information to the controller when establishing a TCP connection to a target device corresponding to data, where the registration information may include terminal information such as a first network IP address of the terminal, a port of the terminal, and an identity of the terminal.

Step 704: The terminal sends data including a first TCP four-tuple to a gateway.

The terminal sends data, which is sent to a bridge according to an initial TCP four-tuple, to the gateway using a first network adapter, where the data that is sent using the first network adapter is converted into data including the first TCP four-tuple. A bridge in the terminal may be a physical bridge, a virtual bridge, or another virtual apparatus that can implement a function of a bridge.

Step 706: The gateway sends a first forward mapping information obtaining request to a controller.

When receiving a first data packet of the data that is sent by the terminal and includes the first TCP four-tuple, and when detecting that no forward mapping for forwarding the data including the first TCP four-tuple is locally stored, the gateway sends a first forward mapping information obtaining request to the controller, where the first forward mapping information obtaining request may include information such as an IP address of the target device and a port of the target device.

Step 708: The controller generates the first forward mapping information according to the registration information and the first forward mapping information obtaining request, and sends the first forward mapping information to the gateway.

Further, the controller generates the first forward mapping information according to the first network IP address of the terminal and the port of the terminal which are included in the registration information sent by the terminal, and the IP address of the target device and the port of the target device which are included in the first forward mapping information obtaining request sent by the gateway, where the first forward mapping information is a mapping relationship between the first TCP four-tuple and a destination TCP four-tuple.

Step 710: The gateway forwards the data including the first TCP four-tuple to the target device according to the first forward mapping information.

Step 712: The terminal sends a network handover notification to the controller.

A network handover for the terminal may be an active handover or a passive handover.

When the terminal actively performs a handover, the terminal detects whether a first handover condition is met; when the first handover condition is met, determines to hand over from a first network to a second network, and sends the network handover notification to the controller, where the first handover condition may include at least one of conditions that the terminal leaves a coverage area of the first network, the terminal enters a coverage area of the second network, a connection situation of the second network is better than that of the first network, or it is directed to use the second network first.

When the terminal passively performs a handover, the controller detects whether a second handover condition is met; when the second handover condition is met, the controller sends a handover indication to the terminal, and the terminal sends the network handover notification to the controller according to the handover indication, where the second handover condition may include one or two of conditions that a connection situation of the second network is better than that of the first network or a network utilization rate of the second network is lower than a network utilization rate of the first network.

Step 714: The terminal sends data including a second TCP four-tuple to the gateway.

The terminal sends data, which is sent to the bridge according to the initial TCP four-tuple, to the gateway using a second network adapter, where the data that is sent using the second network adapter is converted into data including the second TCP four-tuple.

Step 716: The gateway sends a second forward mapping information obtaining request to the controller.

When receiving a first data packet of the data that is sent by the terminal and includes the second TCP four-tuple, and when detecting that no forward mapping information for forwarding the data including the second TCP four-tuple is locally stored, the gateway sends a second forward mapping information obtaining request to the controller, where the second forward mapping information obtaining request may include information such as an IP address of the target device and the port of the target device.

Step 718: The controller generates the second forward mapping information according to the network handover notification, and sends the second forward mapping information to the gateway.

Further, the network handover notification sent by the terminal to the controller includes a second network IP address of the terminal; the controller changes the first network IP address in the first forward mapping information into the second network IP address, and sends the changed forward mapping information as the second forward mapping information to the gateway.

Step 720: The gateway forwards the data including the second TCP four-tuple to the target device according to the second forward mapping information.

According to the foregoing description, in the network handover method provided by the embodiment of the present invention, a terminal, before a network handover, converts data including an initial TCP four-tuple into data including a first TCP four-tuple and sends the data including the first TCP four-tuple to a gateway, and after the network handover, converts data including the initial TCP four-tuple into data including a second TCP four-tuple and sends the data including the second TCP four-tuple to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, in the network handover method provided by the embodiment of the present invention, the terminal sends a handover notification to a controller only when detecting that a first handover condition is met or receiving a handover indication sent by the controller. This solves a problem in the prior art that the handover is performed once the terminal enters an overlapping coverage area of the first network and the second network, and achieves objectives of performing the network handover on the terminal in a controlled manner, selecting an optimal network connection solution, optimizing a network utilization rate, and reducing network handover frequency.

Figure 10:
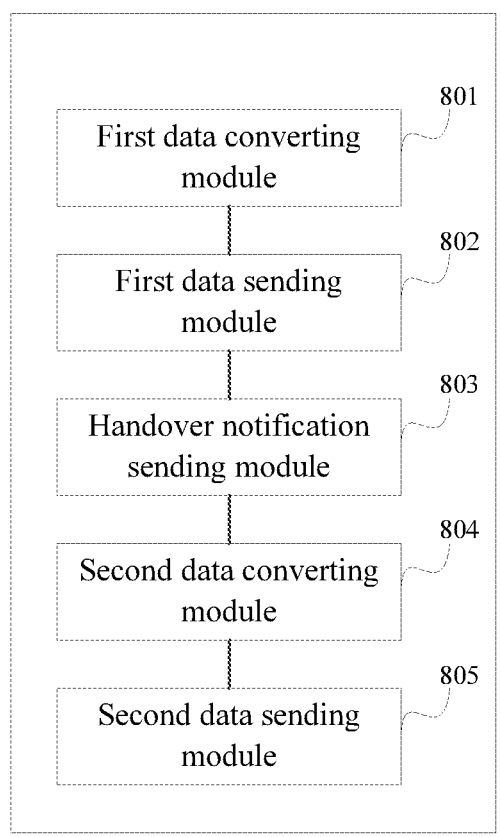
FIG. 10 is a device composition diagram of a terminal according to one embodiment of the present invention.

Referring to FIG. 10, which shows a device composition diagram of a terminal provided by one embodiment of the present invention. The terminal may include a first data converting module 801 configured to when the terminal accesses a first network, convert data including an initial TCP four-tuple into data including a first TCP four-tuple; a first data sending module 802 configured to send the data that is converted by the first data converting module 801 and includes the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device; a handover notification sending module 803 configured to when the terminal hands over from the first network to a second network, send a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple; a second data converting module 804 configured to convert data including the initial TCP four-tuple into data including the second TCP four-tuple; and a second data sending module 805 configured to send the data that is converted by the second data converting module 804 and includes the second TCP four-tuple to the gateway, so that the gateway forwards the data including the second TCP four-tuple to the target device according to the second forward mapping information.

According to the foregoing description, the terminal provided by the embodiment of the present invention, before a network handover, converts data including an initial TCP four-tuple into data including a first TCP four-tuple and sends the data including the first TCP four-tuple to a gateway, and after the network handover, converts data including the initial TCP four-tuple into data including a second TCP four-tuple and sends the data including the second TCP four-tuple to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 11:
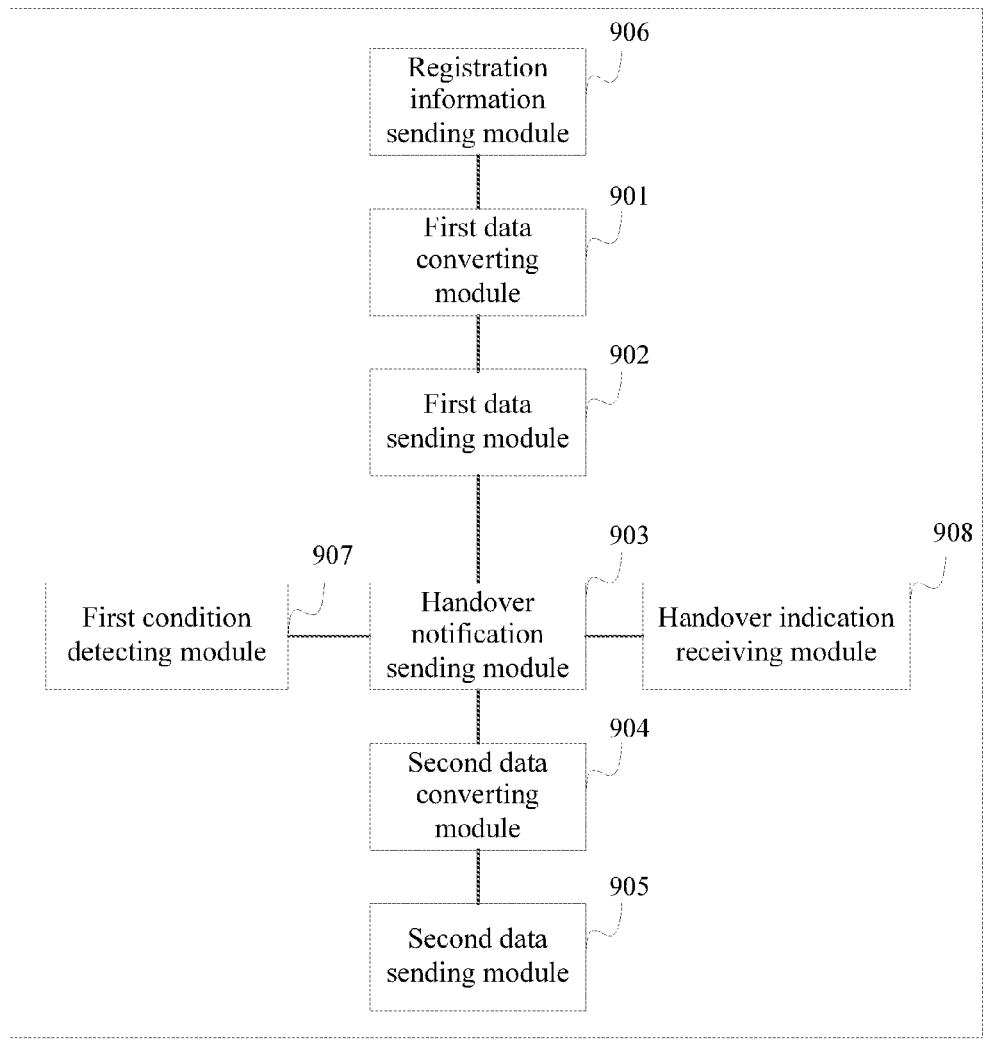
FIG. 11 is a device composition diagram of a terminal according to another embodiment of the present invention.

For a more exemplary solution based on the foregoing terminal shown in FIG. 10, refer to FIG. 11, which shows a device composition diagram of a terminal provided by another embodiment of the present invention. The terminal may include a first data converting module 901 configured to when the terminal accesses a first network, convert data including an initial TCP four-tuple into data including a first TCP four-tuple; a first data sending module 902 configured to send the data that is converted by the first data converting module 901 and includes the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device; a handover notification sending module 903 configured to when the terminal hands over from the first network to a second network, send a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple; a second data converting module 904 configured to convert data including the initial TCP four-tuple into data including the second TCP four-tuple after the terminal hands over from the first network to the second network; and a second data sending module 905 configured to send the data that is converted by the second data converting module 904 and includes the second TCP four-tuple to the gateway, so that the gateway forwards the data including the second TCP four-tuple to the target device according to the second forward mapping information.

The terminal has an initial IP address, a first network IP address, and a second network IP address, where in the initial TCP four-tuple, a source IP address is the initial IP address and a destination IP address is an IP address of the target device; in the first TCP four-tuple, a source IP address is the first network IP address and a destination IP address is the IP address of the target device; in the second TCP four-tuple, a source IP address is the second network IP address and a destination IP address is the IP address of the target device; and in the destination TCP four-tuple, a source IP address is an IP address of the gateway and a destination IP address is the IP address of the target device.

The initial IP address may be an IP address of a physical bridge in the terminal, or an IP address of a virtual bridge or another virtual apparatus having a function of a bridge. The first network IP address may be an IP address of a first network adapter in the terminal, and the second network IP address may be an IP address of a second network adapter in the terminal. The first data converting module 901 and the first data sending module 902 may be implemented as the first network adapter or a part of the first network adapter in the terminal, and the second data converting module 904 and the second data sending module 905 may be implemented as the second network adapter or a part of the second network adapter in the terminal.

The terminal further includes a registration information sending module 906 configured to before the first data converting module 901 converts the data including the initial TCP four-tuple into the data including the first TCP four-tuple, send registration information to the controller, where the registration information includes the first network IP address, so that the controller generates the first forward mapping information according to the first network IP address.

The terminal further includes a first condition detecting module 907 configured to before the handover notification sending module 903 sends the network handover notification to the controller, detect whether a first handover condition is met.

When the first condition detecting module 907 detects that the first handover condition is met, the terminal hands over from the first network to the second network.

The first handover condition includes at least one of the following four conditions: the terminal leaves a coverage area of the first network; or the terminal enters a coverage area of the second network; or a connection situation of the second network is better than that of the first network; or the terminal is directed to use the second network first.

The terminal further includes a handover indication receiving module 908 configured to before the handover notification sending module 903 sends the network handover notification to the controller, receive a handover indication sent by the controller, where the handover indication is an indication that is sent by the controller when the controller detects that a second handover condition is met, where the handover notification sending module 903 is configured to send the network handover notification to the controller according to the handover indication received by the handover indication receiving module 908.

The second handover condition includes at least one of the following two conditions: a connection situation of the second network is better than that of the first network, or a network utilization rate of the second network is lower than a network utilization rate of the first network.

According to the foregoing description, the terminal provided by the embodiment of the present invention, before a network handover, converts data including an initial TCP four-tuple into data including a first TCP four-tuple and sends the data including the first TCP four-tuple to a gateway, and after the network handover, converts data including the initial TCP four-tuple into data including a second TCP four-tuple and sends the data including the second TCP four-tuple to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, the terminal provided by the embodiment of the present invention sends a handover notification to a controller only when detecting that a first handover condition is met or receiving a handover indication sent by the controller. This solves a problem in the prior art that handover is performed once the terminal enters an overlapping coverage area of the first network and the second network, and achieves objectives of selecting an optimal network connection solution, optimizing a network utilization rate, and reducing network handover frequency.

Figure 12:
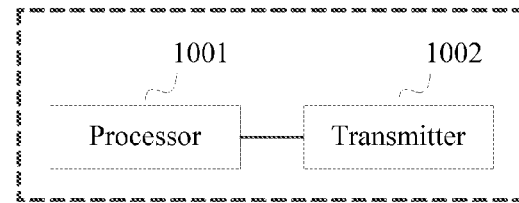
FIG. 12 is a device composition diagram of a terminal according to one embodiment of the present invention.

Referring to FIG. 12, which shows a device composition diagram of a terminal provided by one embodiment of the present invention. The terminal may include a processor 1001 and a transmitter 1002, where the processor 1001 is configured to when the terminal accesses a first network, convert data including an initial TCP four-tuple into data including a first TCP four-tuple; the processor 1001 is configured to control the transmitter 1002 to send the converted data including the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device; the processor 1001 is further configured to when the terminal hands over from the first network to a second network, control the transmitter 1002 to send a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple; the processor 1001 is configured to convert data including the initial TCP four-tuple into data including the second TCP four-tuple after the terminal hands over from the first network to the second network; and the processor 1001 is configured to control the transmitter 1002 to send the converted data including the second TCP four-tuple to the gateway, so that the gateway forwards the data including the second TCP four-tuple to the target device according to the second forward mapping information.

According to the foregoing description, the terminal provided by the embodiment of the present invention, before a network handover, converts data including an initial TCP four-tuple into data including a first TCP four-tuple and sends the data including the first TCP four-tuple to a gateway, and after the network handover, converts data including the initial TCP four-tuple into data including a second TCP four-tuple and sends the data including the second TCP four-tuple to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 13:
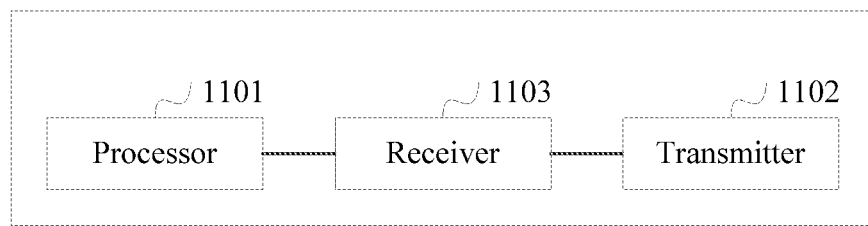
FIG. 13 is a device composition diagram of a terminal according to another embodiment of the present invention.

For a more exemplary solution based on the foregoing terminal shown in FIG. 12, refer to FIG. 13, which shows a device composition diagram of a terminal provided by the embodiment of the present invention. The terminal may include a processor 1101, a transmitter 1102, and a receiver 1103, where the processor 1101 is configured to when the terminal accesses a first network, convert data including an initial TCP four-tuple into data including a first TCP four-tuple; the processor 1101 is configured to control the transmitter 1102 to send the converted data including the first TCP four-tuple to a gateway, so that the gateway forwards the data including the first TCP four-tuple to a target device according to first forward mapping information sent by a controller, where the first forward mapping information includes a mapping relationship between the first TCP four-tuple and a destination TCP four-tuple, and the destination TCP four-tuple is a TCP four-tuple corresponding to the target device; the processor 1101 is further configured to when the terminal hands over from the first network to a second network, control the transmitter 1102 to send a network handover notification to the controller, so that the controller generates second forward mapping information according to the network handover notification, and sends the second forward mapping information to the gateway, where the second forward mapping information includes a mapping relationship between a second TCP four-tuple and the destination TCP four-tuple; the processor 1101 is configured to convert data including the initial TCP four-tuple into data including the second TCP four-tuple after the terminal hands over from the first network to the second network; and the processor 1101 is configured to control the transmitter 1102 to send the converted data including the second TCP four-tuple to the gateway, so that the gateway forwards the data including the second TCP four-tuple to the target device according to the second forward mapping information.

The terminal has an initial IP address, a first network IP address, and a second network IP address, where in the initial TCP four-tuple, a source IP address is the initial IP address and a destination IP address is an IP address of the target device; in the first TCP four-tuple, a source IP address is the first network IP address and a destination IP address is the IP address of the target device; in the second TCP four-tuple, a source IP address is the second network IP address and a destination IP address is the IP address of the target device; and in the destination TCP four-tuple, a source IP address is an IP address of the gateway and a destination IP address is the IP address of the target device.

The processor 1101 is further configured to before converting the data including the initial TCP four-tuple into the data including the first TCP four-tuple, control the transmitter 1102 to send registration information to the controller, where the registration information includes the first network IP address, so that the controller generates the first forward mapping information according to the first network IP address.

The processor 1101 is configured to before controlling the transmitter 1102 to send the network handover notification to the controller, detect whether a first handover condition is met, where when the first handover condition is met, the terminal hands over from the first network to the second network, and performs the step of controlling the transmitter 1102 to send the network handover notification to the controller.

The first handover condition includes at least one of the following four conditions: the terminal leaves a coverage area of the first network; or the terminal enters a coverage area of the second network; or a connection situation of the second network is better than that of the first network; or the terminal is directed to use the second network first.

The receiver 1103 is configured to before the processor 1101 controls the transmitter 1102 to send the network handover notification to the controller, receive a handover indication sent by the controller, where the handover indication is an indication that is sent by the controller when the controller detects that a second handover condition is met.

The processor 1101 is configured to control, according to the handover indication received by the receiver 1103, the transmitter 1102 to send the network handover notification to the controller.

The second handover condition includes at least one of the following two conditions: a connection situation of the second network is better than that of the first network, or a network utilization rate of the second network is lower than a network utilization rate of the first network.

According to the foregoing description, the terminal provided by the embodiment of the present invention, before a network handover, converts data including an initial TCP four-tuple into data including a first TCP four-tuple and sends the data including the first TCP four-tuple to a gateway, and after the network handover, converts data including the initial TCP four-tuple into data including a second TCP four-tuple and sends the data including the second TCP four-tuple to the gateway, where before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, the terminal provided by the embodiment of the present invention sends a handover notification to a controller only when detecting that a first handover condition is met or receiving a handover indication. This solves a problem in the prior art that handover is performed once the terminal enters an overlapping coverage area of the first network and the second network, and thereby selecting an optimal network connection solution, optimizing a network utilization rate, and reducing network handover frequency.

Figure 14:
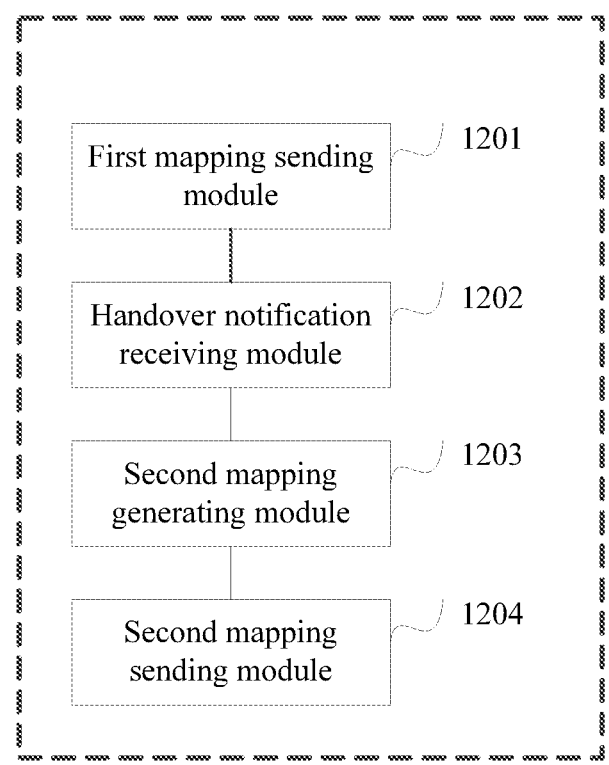
FIG. 14 is a device composition diagram of a controller according to one embodiment of the present invention.

Referring to FIG. 14, which shows a device composition diagram of a controller provided by one embodiment of the present invention. The controller may include a first mapping sending module 1201 configured to when a terminal accesses a first network, send first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; a handover notification receiving module 1202 configured to when the terminal hands over from the first network to a second network, receive a network handover notification sent by the terminal; a second mapping generating module 1203 configured to generate second forward mapping information according to the network handover notification received by the handover notification receiving module 1202; and a second mapping sending module 1204 configured to send the second forward mapping information generated by the second mapping generating module 1203 to the gateway, so that the gateway forwards, after the terminal hands over from the first network to the second network, data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

According to the foregoing description, the controller provided by the embodiment of the present invention, before a terminal performs a network handover, generates first forward mapping information for a gateway, so that the gateway forwards data which includes a first TCP four-tuple and is obtained by the terminal by converting data including an initial TCP four-tuple, to a target device; after the terminal performs the network handover, the controller generates second forward mapping information for the gateway, so that the gateway forwards data which includes a second TCP four-tuple and is obtained by the terminal by converting data including the initial TCP four-tuple to the target device according to the second forward mapping information; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 15:
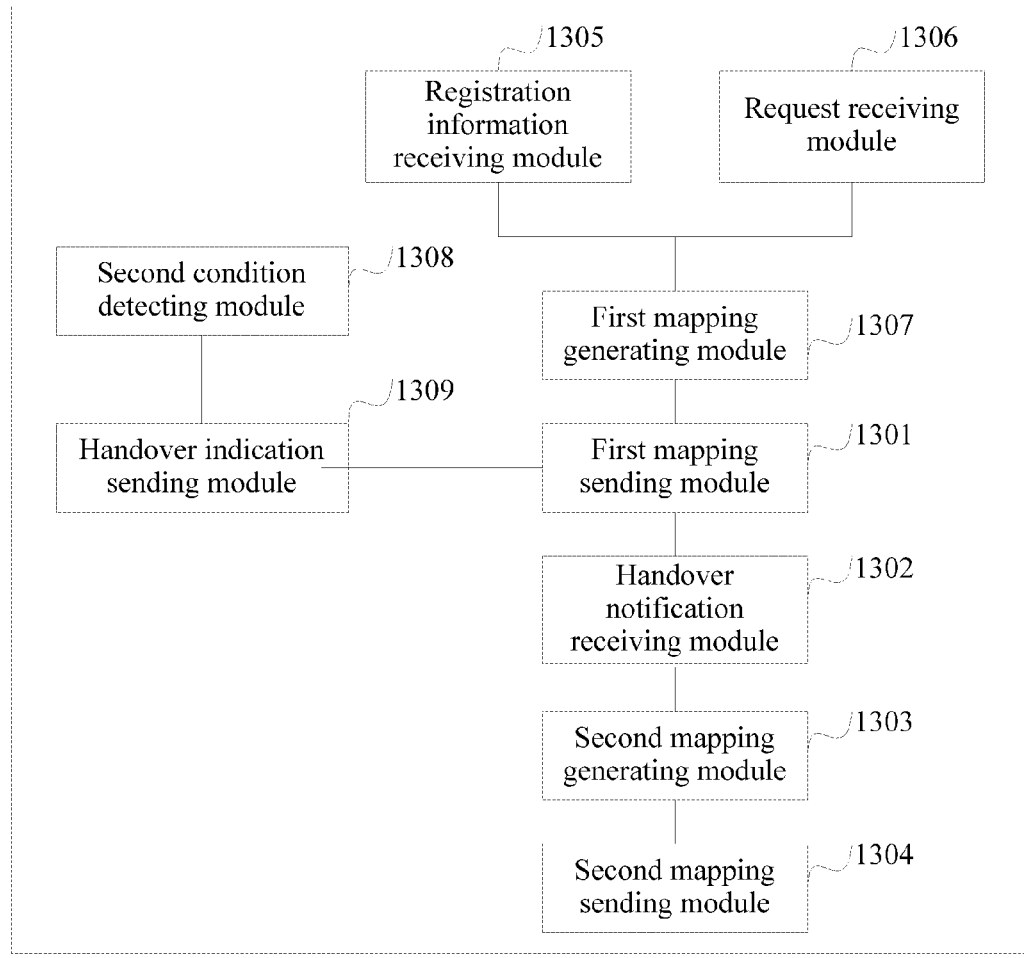
FIG. 15 is a device composition diagram of a controller according to another embodiment of the present invention.

For a more exemplary solution based on the foregoing controller shown in FIG. 14, refer to FIG. 15, which shows a device composition diagram of a controller provided by another embodiment of the present invention. The controller may include a first mapping sending module 1301 configured to when a terminal accesses a first network, send first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; a handover notification receiving module 1302 configured to when the terminal hands over from the first network to a second network, receive a network handover notification sent by the terminal; a second mapping generating module 1303 configured to generate second forward mapping information according to the network handover notification received by the handover notification receiving module 1302; and a second mapping sending module 1304 configured to send the second forward mapping information generated by the second mapping generating module 1303 to the gateway, so that the gateway forwards, after the terminal hands over from the first network to the second network, data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

In the initial TCP four-tuple, a source IP address is an initial IP address of the terminal and a destination IP address is an IP address of the target device; in the first TCP four-tuple, a source IP address is a first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

The controller further includes a registration information receiving module 1305 configured to before the first mapping sending module 1301 sends the first forward mapping information to the gateway, receive registration information sent by the terminal, where the registration information includes the first network IP address of the terminal; a request receiving module 1306 configured to receive a first forward mapping information obtaining request sent by the gateway, where the first forward mapping information obtaining request includes the IP address of the target device; and a first mapping generating module 1307 configured to generate the first forward mapping information according to the first network IP address and the IP address of the target device, and send the first forward mapping information to the gateway.

The controller further includes a second condition detecting module 1308 configured to before the handover notification receiving module 1302 receives the network handover notification sent by the terminal, detect whether a second handover condition is met; and a handover indication sending module 1309 configured to when the second condition detecting module 1308 detects that the second handover condition is met, send a handover indication to the terminal, so that the terminal sends the network handover notification according to the handover indication.

The second handover condition includes at least one of the following two conditions: a connection situation of the second network is better than that of the first network, or a network utilization rate of the second network is lower than a network utilization rate of the first network.

The second mapping generating module 1303 is configured to change the first network IP address in the first forward mapping information into the second network IP address, and use the changed forward mapping information as the second forward mapping information, where the network handover notification includes the second network IP address of the terminal.

According to the foregoing description, the controller provided by the embodiment of the present invention, before a terminal performs a network handover, generates first forward mapping information for a gateway, so that the gateway forwards data which includes a first TCP four-tuple and is obtained by the terminal by converting data including an initial TCP four-tuple, to a target device; after the terminal performs the network handover, generates second forward mapping information for the gateway, so that the gateway forwards data which includes a second TCP four-tuple and is obtained by the terminal by converting data including the initial TCP four-tuple to the target device according to the second forward mapping information; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, the controller provided by the embodiment of the present invention, sends a handover indication to the terminal when detecting that a second preset condition is met, so that the terminal sends a network handover notification according to the handover indication. This solves a problem in the prior art that handover is performed once the terminal enters an overlapping coverage area of the first network and the second network, and achieves objectives of selecting an optimal network connection solution, optimizing a network utilization rate, and reducing network handover frequency.

Figure 16:
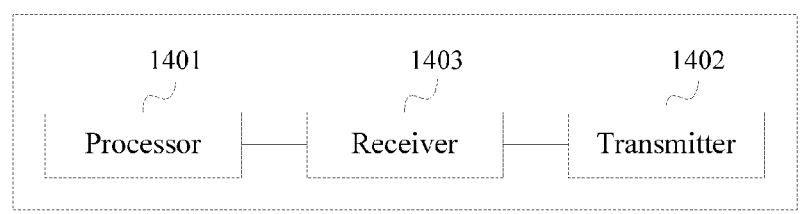
FIG. 16 is a device composition diagram of a controller according to one embodiment of the present invention.

Referring to FIG. 16, which shows a device composition diagram of a controller provided by one embodiment of the present invention. The controller may include a processor 1401, a transmitter 1402, and a receiver 1403, where the processor 1401 is configured to when a terminal accesses a first network, control the transmitter 1402 to send first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; the receiver 1403 is configured to when the terminal hands over from the first network to a second network, receive a network handover notification sent by the terminal; the processor 1401 is configured to generate second forward mapping information according to the network handover notification received by the receiver 1403; and the processor 1401 is configured to control the transmitter 1402 to send the generated second forward mapping information to the gateway, so that the gateway forwards, after the terminal hands over from the first network to the second network, data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

According to the foregoing description, the controller provided by the embodiment of the present invention, before a terminal performs a network handover, generates first forward mapping information for a gateway, so that the gateway forwards data which includes a first TCP four-tuple and is obtained by the terminal by converting data including an initial TCP four-tuple, to a target device; after the terminal performs the network handover, generates second forward mapping information for the gateway, so that the gateway forwards data which includes a second TCP four-tuple and is obtained by the terminal by converting data including the initial TCP four-tuple to the target device according to the second forward mapping information; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 17:
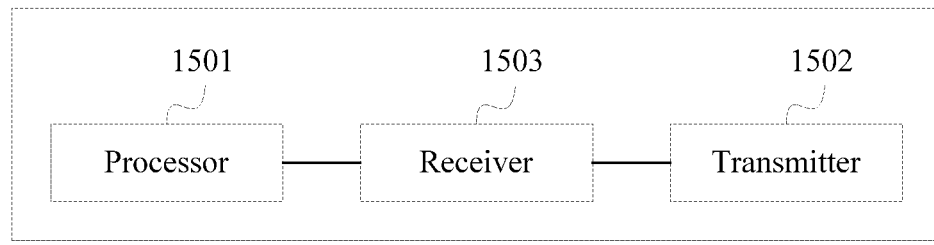
FIG. 17 is a device composition diagram of a controller according to another embodiment of the present invention.

For a more exemplary solution based on the foregoing controller shown in FIG. 16, refer to FIG. 17, which shows a device composition diagram of a controller provided by another embodiment of the present invention. The controller may include a processor 1501, a transmitter 1502, and a receiver 1503, where the processor 1501 is configured to when a terminal accesses a first network, control the transmitter 1502 to send first forward mapping information to a gateway, so that the gateway forwards data that is sent by the terminal and includes a first TCP four-tuple to a target device according to the first forward mapping information, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; the receiver 1503 is configured to when the terminal hands over from the first network to a second network, receive a network handover notification sent by the terminal; the processor 1501 is configured to generate second forward mapping information according to the network handover notification received by the receiver 1503; and the processor 1501 is configured to control the transmitter 1502 to send the generated second forward mapping information to the gateway, so that the gateway forwards, after the terminal hands over from the first network to the second network, data that is sent by the terminal and includes a second TCP four-tuple to the target device according to the second forward mapping information, where the second forward mapping information is a mapping relationship between the second TCP four-tuple and the destination TCP four-tuple, and the data including the second TCP four-tuple is data obtained after the terminal converts data including the initial TCP four-tuple.

In the initial TCP four-tuple, a source IP address is an initial IP address of the terminal and a destination IP address is an IP address of the target device; in the first TCP four-tuple, a source IP address is a first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

The receiver 1503 is configured to before the processor 1501 controls the transmitter 1502 to send the first forward mapping information to the gateway, receive registration information sent by the terminal, where the registration information includes the first network IP address of the terminal.

The receiver 1503 is configured to receive a first forward mapping information obtaining request sent by the gateway, where the first forward mapping information obtaining request includes the IP address of the target device.

The processor 1501 is configured to generate the first forward mapping information according to the first network IP address and the IP address of the target device, and send the first forward mapping information to the gateway.

The processor 1501 is configured to before the receiver 1503 receives the network handover notification sent by the terminal, detect whether a second handover condition is met.

The processor 1501 is configured to when the second handover condition is met, control the transmitter 1502 to send a handover indication to the terminal, so that the terminal sends the network handover notification according to the handover indication.

The second handover condition includes at least one of the following two conditions: a connection situation of the second network is better than that of the first network, or a network utilization rate of the second network is lower than a network utilization rate of the first network.

The processor 1501 is configured to change the first network IP address in the first forward mapping information into the second network IP address, and use the changed forward mapping information as the second forward mapping information, where the network handover notification includes the second network IP address of the terminal.

According to the foregoing description, the controller provided by the embodiment of the present invention, before a terminal performs a network handover, generates first forward mapping information for a gateway, so that the gateway forwards data which includes a first TCP four-tuple and is obtained by the terminal by converting data including an initial TCP four-tuple, to a target device; after the terminal performs the network handover, generates second forward mapping information for the gateway, so that the gateway forwards data which includes a second TCP four-tuple and is obtained by the terminal by converting data including the initial TCP four-tuple to the target device according to the second forward mapping information; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, the controller provided by the embodiment of the present invention, sends a handover indication to the terminal when detecting that a second preset condition is met, so that the terminal sends a network handover notification according to the handover indication. This solves a problem in the prior art that handover is performed once the terminal enters an overlapping coverage area of the first network and the second network, and achieves objectives of selecting an optimal network connection solution, optimizing a network utilization rate, and reducing network handover frequency.

Figure 18:
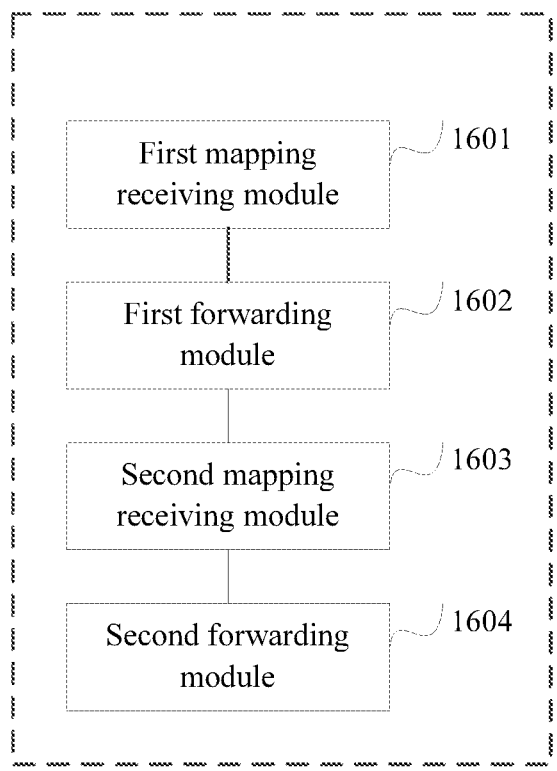
FIG. 18 is a device composition diagram of a gateway according to one embodiment of the present invention.

Referring to FIG. 18, which shows a device composition diagram of a gateway provided by one embodiment of the present invention. The gateway may include a first mapping receiving module 1601 configured to when a terminal accesses a first network, receive first forward mapping information sent by a controller; a first forwarding module 1602 configured to forward data that is sent by the terminal and includes a first TCP four-tuple to a target device according to the first forward mapping information received by the first mapping receiving module 1601, where the first forward mapping information includes a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; a second mapping receiving module 1603 configured to after the terminal hands over from the first network to a second network, receive second forward mapping information sent by the controller; and a second forwarding module 1604 configured to forward data that is sent by the terminal and includes a second TCP four-tuple to the target device according to the second forward mapping information received by the second mapping receiving module 1603, where the second forward mapping information is a mapping relationship between the second TCP four-tuple and the destination TCP four-tuple, and the data including the second TCP four-tuple is data obtained after the terminal converts data including the initial TCP four-tuple.

According to the foregoing description, the gateway provided by the embodiment of the present invention, before a terminal performs a network handover, forwards data which includes a first TCP four-tuple and is obtained by the terminal by converting data including an initial TCP four-tuple, to a target device according to first forward mapping information sent by a controller; after the terminal performs the network handover, forwards data which includes a second TCP four-tuple and is obtained by the terminal by converting data including the initial TCP four-tuple to the target device according to second forward mapping information sent by the controller; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 19:
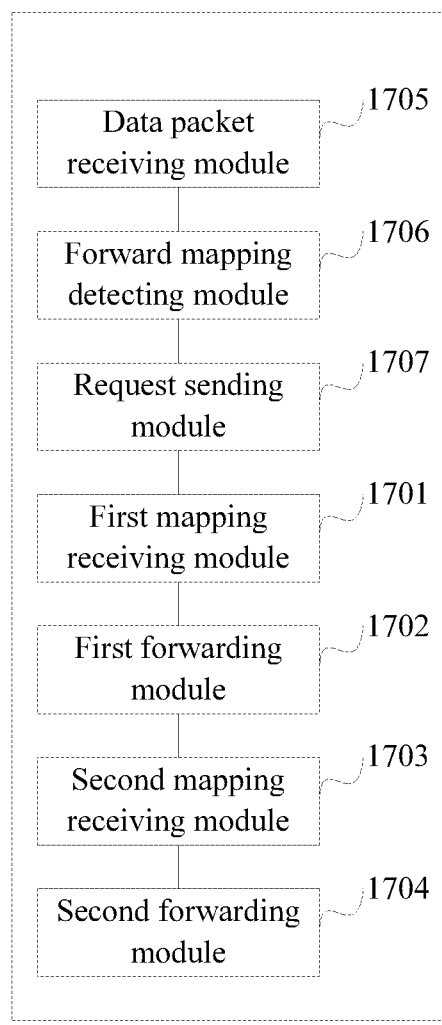
FIG. 19 is a device composition diagram of a gateway according to another embodiment of the present invention.

For a more exemplary solution based on the foregoing gateway shown in FIG. 18, refer to FIG. 19, which shows a device composition diagram of a gateway provided by another embodiment of the present invention. The gateway may include a first mapping receiving module 1701 configured to when a terminal accesses a first network, receive first forward mapping information sent by a controller; a first forwarding module 1702 configured to forward data that is sent by the terminal and includes a first TCP four-tuple to a target device according to the first forward mapping information received by the first mapping receiving module 1701, where the first forward mapping information is a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; a second mapping receiving module 1703 configured to after the terminal hands over from the first network to a second network, receive second forward mapping information sent by the controller; and a second forwarding module 1704 configured to forward data that is sent by the terminal and includes a second TCP four-tuple to the target device according to the second forward mapping information received by the second mapping receiving module 1703, where the second forward mapping information is a mapping relationship between the second TCP four-tuple and the destination TCP four-tuple, and the data including the second TCP four-tuple is data obtained after the terminal converts data including the initial TCP four-tuple.

In the initial TCP four-tuple, a source IP address is an initial IP address of the terminal and a destination IP address is an IP address of the target device; in the first TCP four-tuple, a source IP address is a first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

The gateway further includes a data packet receiving module 1705 configured to before the first mapping receiving module 1701 receives the first forward mapping information sent by the controller, receive a first data packet of the data that is sent by the terminal and includes the first TCP four-tuple; a forward mapping detecting module 1706 configured to detect whether the first forward mapping information exists; and a request sending module 1707 configured to when the forward mapping detecting module 1706 detects that the first forward mapping information does not exist, send a first forward mapping information obtaining request to the controller, where the first forward mapping information obtaining request includes the IP address of the target device, so that the controller generates the first forward mapping information according to the IP address of the target device.

According to the foregoing description, the gateway provided by the embodiment of the present invention, before a terminal performs a network handover, forwards data which includes a first TCP four-tuple and is obtained by the terminal by converting data including an initial TCP four-tuple, to a target device according to first forward mapping information sent by a controller; after the terminal performs the network handover, forwards data which includes a second TCP four-tuple and is obtained by the terminal by converting data including the initial TCP four-tuple to the target device according to second forward mapping information sent by the controller; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 20:
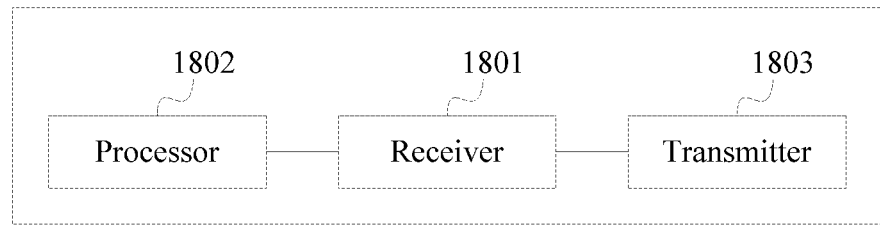
FIG. 20 is a device composition diagram of a gateway according to one embodiment of the present invention.

Referring to FIG. 20, which shows a device composition diagram of a gateway provided by one embodiment of the present invention. The gateway may include a receiver 1801, a processor 1802, and a transmitter 1803, where the receiver 1801 is configured to when a terminal accesses a first network, receive first forward mapping information sent by a controller; the processor 1802 is configured to control the transmitter 1803 to forward, according to the first forward mapping information received by the receiver 1801, data that is sent by the terminal and includes a first TCP four-tuple to a target device, where the first forward mapping information is a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; the receiver 1801 is configured to after the terminal hands over from the first network to a second network, receive second forward mapping information sent by the controller; and the processor 1802 is configured to control the transmitter 1803 to forward, according to the second forward mapping information received by the receiver 1801, data that is sent by the terminal and includes a second TCP four-tuple to a target device, where the second forward mapping information is a mapping relationship between the second TCP four-tuple and the destination TCP four-tuple, and the data including the second TCP four-tuple is obtained after the terminal converts data including the initial TCP four-tuple.

According to the foregoing description, the gateway provided by the embodiment of the present invention, before a terminal performs a network handover, forwards data which includes a first TCP four-tuple and is obtained by the terminal by converting data including an initial TCP four-tuple, to a target device according to first forward mapping information sent by a controller; after the terminal performs the network handover, forwards data which includes a second TCP four-tuple and is obtained by the terminal by converting data including the initial TCP four-tuple to the target device according to second forward mapping information sent by the controller; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 21:
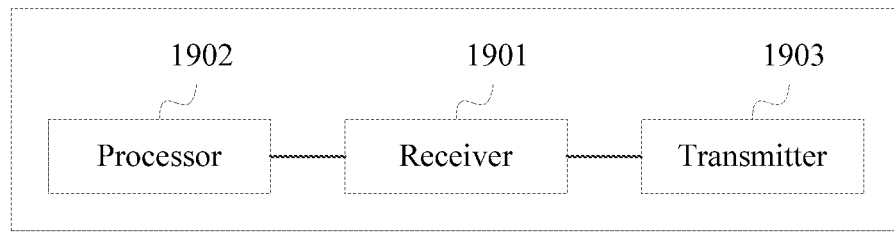
FIG. 21 is a device composition diagram of a gateway according to another embodiment of the present invention.

For a more exemplary solution based on the foregoing gateway shown in FIG. 20, refer to FIG. 21, which shows a device composition diagram of a gateway provided by an embodiment of the present invention. The gateway may include a receiver 1901, a processor 1902, and a transmitter 1903, where the receiver 1901 is configured to when a terminal accesses a first network, receive first forward mapping information sent by a controller; the processor 1902 is configured to control the transmitter 1903 to forward, according to the first forward mapping information received by the receiver 1901, data that is sent by the terminal and includes a first TCP four-tuple to a target device, where the first forward mapping information is a mapping relationship between the first TCP four-tuple and a destination TCP four-tuple, the data including the first TCP four-tuple is data obtained after the terminal converts data including an initial TCP four-tuple, and the destination TCP four-tuple is a TCP four-tuple corresponding to the target device; the receiver 1901 is configured to when the terminal hands over from the first network to a second network, receive second forward mapping information sent by the controller; and the processor 1902 is configured to control the transmitter 1903 to forward, according to the second forward mapping information received by the receiver 1901, data that is sent by the terminal and includes a second TCP four-tuple to a target device, where the second forward mapping information is a mapping relationship between the second TCP four-tuple and the destination TCP four-tuple, and the data including the second TCP four-tuple is data obtained after the terminal converts data including the initial TCP four-tuple.

In the initial TCP four-tuple, a source IP address is an initial IP address of the terminal and a destination IP address is an IP address of the target device; in the first TCP four-tuple, a source IP address is a first network IP address of the terminal and a destination IP address is the IP address of the target device; in the second TCP four-tuple, a source IP address is a second network IP address of the terminal and a destination IP address is the IP address of the target device; and in the destination TCP four-tuple, a source IP address is an IP address of the gateway and a destination IP address is the IP address of the target device.

The receiver 1901 is configured to before receiving the first forward mapping information sent by the controller, receive a first data packet of the data that is sent by the terminal and includes the first TCP four-tuple.

The processor 1902 is configured to detect whether the first forward mapping information exists.

The processor 1902 is configured to when detecting that the first forward mapping information does not exist, control the transmitter 1903 to send a first forward mapping information obtaining request to the controller, where the first forward mapping information obtaining request includes the IP address of the target device, so that the controller generates the first forward mapping information according to the IP address of the target device.

According to the foregoing description, the gateway provided by the embodiment of the present invention, before a terminal performs a network handover, forwards data which includes a first TCP four-tuple and is obtained by the terminal by converting data including an initial TCP four-tuple, to a target device according to first forward mapping information sent by a controller; after the terminal performs the network handover, forwards data which includes a second TCP four-tuple and is obtained by the terminal by converting data including the initial TCP four-tuple to the target device according to second forward mapping information sent by the controller; because before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced.

Figure 22:
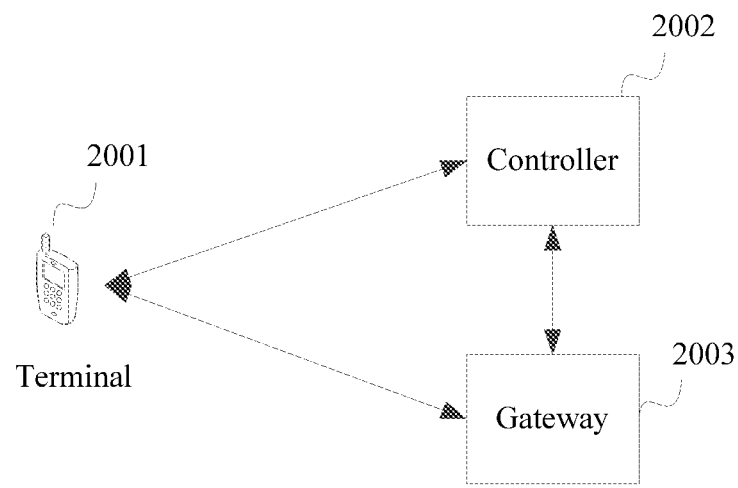
FIG. 22 is a system composition diagram of a network handover system according to one embodiment of the present invention.

Referring to FIG. 22, which shows a system composition diagram of a network handover system provided by one embodiment of the present invention. The network handover system may include a terminal 2001 shown in FIG. 10 or FIG. 11, a controller 2002 shown in FIG. 14 or FIG. 15, and a gateway 2003 shown in FIG. 18 or FIG. 19.

According to the foregoing description, in the network handover system provided by the embodiment of the present invention, a terminal, before a network handover, converts data including an initial TCP four-tuple into data including a first TCP four-tuple and sends the data including the first TCP four-tuple to a gateway, so that the gateway forwards the data including the first TCP four-tuple to a target device according to first forward mapping information sent by a controller; after the network handover, the terminal converts data including the initial TCP four-tuple into data including a second TCP four-tuple, and sends the data including the second TCP four-tuple to the gateway, so that the gateway forwards the data including the second TCP four-tuple to the target device according to the second forward mapping information sent by the controller; before and after the network handover, the initial TCP four-tuple of the data in the terminal remains unchanged, so that a case in which data transmission is not synchronized before and after the network handover does not occur. This solves, to a certain extent, a problem in the prior art that a base station of a first network and a base station of a second network must perform frame synchronization using the gateway, and achieves objectives that a connection between the terminal and a target device is not interrupted during the network handover, use experience is improved, and complexity of a network handover process is reduced. In addition, in the network handover system provided by the embodiment of the present invention, the terminal sends a handover notification to a controller only when detecting that a first handover condition is met or receiving a handover indication. This solves a problem in the prior art that the handover is performed once the terminal enters an overlapping coverage area of the first network and the second network, and achieves objectives of selecting an optimal network connection solution, optimizing a network utilization rate, and reducing network handover frequency.

It should be noted that the controller provided by the foregoing embodiments may be deployed independently or be deployed in a network element; moreover, when the terminal, the controller, and the gateway that are provided by the embodiments of the present invention perform a network handover, the division of foregoing functional modules are merely described as an example. In actual application, the functions may be assigned to different functional modules to perform according to requirements. That is, an interior structure of a device is divided into different functional modules to perform all or a part of functions described above. In addition, the terminal, the controller, and the gateway that are provided by the foregoing embodiments belong to the same concept as the network handover method, and reference may be made to the method embodiment for specific implementation processes thereof, which will not be described repeatedly herein.

The serial numbers of the foregoing embodiments of the present invention are used merely for description, and do not represent priority of the embodiments.

A person of ordinary skill in the art may understand that all or a part of the steps of the embodiments may be implemented by hardware or a program instructing relevant hardware. The program may be stored in a computer readable storage medium. The storage medium may include a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A network handover method, implemented by a terminal comprising a first physical network adapter, a second physical network adapter, and a virtual network adapter operably disposed in the terminal and coupled to the first physical network adapter and the second physical network adapter, wherein the method comprises:

establishing, by the terminal, a Transmission Control Protocol (TCP) connection between the terminal and a target device using an Internet protocol (IP) address of the virtual network adapter as a source IP address and an IP address of the target device as a destination address;

converting, by the terminal, a source IP address of a first data packet from the IP address of the virtual network adapter into an IP address of the first physical network adapter when the terminal accesses a first network, wherein a destination address of the first data packet is the IP address of the target device;

sending the converted first data packet of which the source IP address is the IP address of the first physical network adapter to a gateway, wherein the gateway forwards the converted first data packet to the target device according to first forward mapping information sent by a controller, wherein the first forward mapping information comprises a mapping relationship between a first TCP four-tuple and a destination TCP four-tuple corresponding to the target device, wherein the source IP address is the IP address of the first physical network adapter in the first TCP four-tuple, wherein a destination IP address is the IP address of the target device in the first TCP four-tuple, wherein the source IP address is an IP address of the gateway in the destination TCP four-tuple, and wherein the destination IP address is the IP address of the target device in the destination TCP four-tuple;

sending, by the terminal, a network handover notification to the controller when the terminal hands over from the first network to a second network, wherein the controller generates second forward mapping information according to the network handover notification and sends the second forward mapping information to the gateway, wherein the second forward mapping information comprises a mapping relationship between a second TCP four-tuple and the destination TCP four-tuple, wherein the source IP address is the IP address of the second physical network adapter in the second TCP four-tuple, and wherein the destination IP address is the IP address of the target device;

converting, by the terminal, a source IP address of a second data packet from the IP address of the virtual network adapter into the IP address of the second physical network adapter when the terminal accesses the second network; and sending the converted second data packet of which the source IP address is the IP address of the second physical network adapter to the gateway, wherein the gateway forwards the second data packet to the target device according to the second forward mapping information.

2. The method according to claim 1, further comprising sending, by the terminal, registration information to the controller, wherein the registration information comprises the IP address of the first physical network adapter, and wherein the controller generates the first forward mapping information according to the IP address of the first physical network adapter and sends the first forward mapping information to the gateway.

3. The method according to claim 1, wherein before sending, by the terminal, the network handover notification to the controller, the method further comprises handing over, by the terminal, from the first network to the second network when a first handover condition is met, and wherein the first handover condition comprises at least one of the following four conditions: the terminal leaves a coverage area of the first network, the terminal enters a coverage area of the second network, a connection situation of the second network is better than that of the first network, or the terminal is directed to use the second network first.

4. The method according to claim 1, wherein before sending, by the terminal, the network handover notification to the controller, the method further comprises receiving, by the terminal, a handover indication sent by the controller, wherein the handover indication is an indication that is sent by the controller when the controller detects that a second handover condition is met, wherein sending, by the terminal, a network handover notification to the controller comprises sending, by the terminal, the network handover notification to the controller according to the handover indication, and wherein the second handover condition comprises at least one of the following two conditions: a connection situation of the second network is better than that of the first network, or a network utilization rate of the second network is lower than a network utilization rate of the first network.

5. A network handover method, implemented by a terminal comprising a first physical network adapter, a second physical network adapter, and a virtual network adapter operably disposed in the terminal and coupled to the first physical network adapter and the second physical network adapter, wherein the method comprises:

sending, by a controller, first forward mapping information to a gateway when the terminal accesses a first network, wherein a Transmission Control Protocol (TCP) connection is established between the terminal and a target device using an Internet Protocol (IP) address of the virtual network adapter as a source IP address and an IP address of the target device as a destination address, wherein the gateway forwards a first data packet that is sent by the terminal and comprises an IP address of the first physical network adapter to the target device according to the first forward mapping information, wherein the first forward mapping information comprises a mapping relationship between a first TCP four-tuple and a destination TCP four-tuple corresponding to the target device, wherein the first data packet is data obtained by converting a source IP address of the first data packet from the IP address of the virtual network adapter into an IP address of the first physical network adapter when the terminal accesses the first network, wherein the source IP address is the IP address of the first physical network adapter in the first TCP four-tuple, wherein a destination IP address is the IP address of the target device in the first TCP four-tuple, wherein the source IP address is an IP address of the gateway in the destination TCP four-tuple, and wherein the destination IP address is the IP address of the target device in the destination TCP four-tuple;

receiving, by the controller, a network handover notification sent by the terminal when the terminal hands over from the first network to a second network;

generating, by the controller, second forward mapping information according to the network handover notification; and sending the second forward mapping information to the gateway, wherein the gateway forwards a second data packet that is sent by the terminal and comprises an IP address of the second physical network adapter to the target device according to the second forward mapping information, wherein the second forward mapping information is a mapping relationship between a second TCP four-tuple and the destination TCP four-tuple, wherein the second data packet is obtained by converting a source IP address of the second data packet from the IP address of the virtual network adapter into an IP address of the second physical network adapter when the terminal accesses the second network, wherein the source IP address is the IP address of the second physical network adapter in the second TCP four-tuple, and wherein the destination IP address is the IP address of the target device.

6. The method according to claim 5, wherein, before sending, by the controller, first forward mapping information to the gateway, the method further comprises:
receiving, by the controller, registration information sent by the terminal, wherein the registration information comprises the IP address of the first physical network adapter;
receiving, by the controller, a first forward mapping information obtaining request sent by the gateway, wherein the first forward mapping information obtaining request comprises the IP address of the target device;
generating, by the controller, the first forward mapping information according to the IP address of the first physical network adapter and the IP address of the target device; and
sending, by the controller, the first forward mapping information to the gateway.

7. The method according to claim 6, wherein the network handover notification comprises the IP address of the second physical network adapter, and wherein generating, by the controller, the second forward mapping information according to the network handover notification comprises:
changing, by the controller, the IP address of the first physical network adapter in the first forward mapping information to the IP address of the second physical network adapter; and
using, by the controller, the changed forward mapping information as the second forward mapping information.

8. The method according to claim 5, wherein before receiving, by the controller, the network handover notification sent by the terminal, the method further comprises sending, by the controller, a handover indication to the terminal when a second handover condition is met, wherein the terminal sends the network handover notification according to the handover indication, and wherein the second handover condition comprises at least one of the following two conditions: a connection situation of the second network is better than that of the first network, or a network utilization rate of the second network is lower than a network utilization rate of the first network.

9. A terminal comprising:
a first physical network adapter;
a second physical network adapter;
a virtual network adapter coupled to the first physical network adapter and the second physical network adapter;
a processor coupled to the first physical network adapter, the second physical network adapter, and the virtual network adapter; and
a non-transitory processor-readable medium having processor-executable instructions stored thereon, the processor-executable instructions including instructions for the processor to:
establish a Transmission Control Protocol (TCP) connection between the terminal and a target device using an Internet protocol (IP) address of the virtual network adapter as a source IP address and an IP address of the target device as a destination address;
convert a source IP address of a first data packet from the IP address of the virtual network adapter into an IP address of the first physical network adapter when the terminal accesses a first network, wherein a destination address of the first data packet is the IP address of the target device;
send the converted first data packet of which the source IP address is the IP address of the first physical network adapter to a gateway, wherein the gateway forwards the converted first data packet to a target device according to first forward mapping information sent by a controller, wherein the first forward mapping information comprises a mapping relationship between a first TCP four-tuple and a destination TCP four-tuple corresponding to the target device, wherein the source IP address is the IP address of the first physical network adapter in the first TCP four-tuple, wherein a destination IP address is the IP address of the target device in the first TCP four-tuple, wherein the source IP address is an IP address of the gateway in the destination TCP four-tuple, and wherein the destination IP address is the IP address of the target device in the destination TCP four-tuple;
send a network handover notification to the controller when the terminal hands over from the first network to a second network, wherein the controller generates second forward mapping information according to the network handover notification and sends the second forward mapping information to the gateway, wherein the second forward mapping information comprises a mapping relationship between a second TCP four-tuple and the destination TCP four-tuple, wherein the source IP address is the IP address of the second physical network adapter in the second TCP four-tuple, and wherein the destination IP address is the IP address of the target device;
convert a source IP address of a second data packet from the IP address of the virtual network adapter into the IP address of the second physical network adapter; and
send the converted second data packet of which the source IP address is the IP address of the second physical network adapter to the gateway, wherein the gateway forwards the second data packet comprising the second TCP four-tuple to the target device according to the second forward mapping information.

10. The terminal according to claim 9, wherein the processor-executable instructions further include instructions for the processor to send registration information to the controller, wherein the registration information comprises an IP address of the first physical network adapter, wherein the controller generates the first forward mapping information according to the IP address of the first physical network adapter.

11. The terminal according to claim 9, wherein the processor-executable instructions further include instructions for the processor to hand over the terminal from the first network to the second network when a first handover condition is met, and wherein the first handover condition comprises at least one of the following four conditions: the terminal leaves a coverage area of the first network, the terminal enters a coverage area of the second network, a connection situation of the second network is better than that of the first network, or the terminal is directed to use the second network first.

12. The terminal according to claim 9, wherein the processor-executable instructions further include instructions for the processor to:
receive a handover indication sent by the controller before the network handover notification is sent to the controller, wherein the handover indication is an indication that is sent by the controller when the controller detects that a second handover condition is met; and
send the network handover notification to the controller according to the handover indication, and wherein the second handover condition comprises at least one of the following two conditions: a connection situation of the second network is better than that of the first network, or a network utilization rate of the second network is lower than a network utilization rate of the first network.

13. A controller comprising:
a processor; and
a non-transitory processor-readable medium having processor-executable instructions stored thereon, the processor-executable instructions including instructions for the processor to:
send first forward mapping information to a gateway when a terminal accesses a first network, wherein the terminal comprises a first physical network adapter, a second physical network adapter, and a virtual network adapter operably disposed in the terminal and coupled to the first physical network adapter and the second physical network adapter, wherein a Transmission Control Protocol (TCP) connection is established between the terminal and a target device using an Internet Protocol (IP) address of the virtual network adapter as a source IP address and an IP address of the target device as a destination address, wherein the gateway forwards a first data packet that is sent by the terminal and comprises an IP address of the first physical network adapter to the target device according to the first forward mapping information, wherein the first forward mapping information comprises a mapping relationship between a first TCP four-tuple and a destination TCP four-tuple corresponding to the target device, wherein the first data packet is data obtained after the terminal converts a source IP address of the first data packet from the IP address of the virtual network adapter into an IP address of the first physical network adapter, wherein the source IP address is the IP address of the first physical network adapter in the first TCP four-tuple, wherein a destination IP address is the IP address of the target device in the first TCP four-tuple, wherein the source IP address is an IP address of the gateway in the destination TCP four-tuple, and wherein the destination IP address is the IP address of the target device in the destination TCP four-tuple;
receive a network handover notification sent by the terminal when the terminal hands over from the first network to a second network;
generate second forward mapping information according to the network handover notification; and
send the second forward mapping information to the gateway, wherein the gateway forwards a second data packet that is sent by the terminal and comprises an IP address of the second physical network adapter to the target device according to the second forward mapping information, wherein the second forward mapping information is a mapping relationship between a second TCP four-tuple and the destination TCP four-tuple, wherein the second data packet is obtained after the terminal converts a source IP address of the second data packet from the IP address of the virtual network adapter into an IP address of the second physical network adapter, wherein the source IP address is the IP address of the second physical network adapter in the second TCP four-tuple, and wherein the destination IP address is the IP address of the target device.

14. The controller according to claim 13, wherein the processor-executable instructions further include instructions for the processor to:
receive registration information sent by the terminal before the first forward mapping information is sent to the gateway, wherein the registration information comprises the IP address of the first physical network adapter;
receive a first forward mapping information obtaining request sent by the gateway, wherein the first forward mapping information obtaining request comprises the IP address of the target device;
generate the first forward mapping information according to the IP address of the first physical network adapter and the IP address of the target device; and
send the first forward mapping information to the gateway.

15. The controller according to claim 14, wherein the processor-executable instructions further include instructions for the processor to:
change the IP address of the first physical network adapter in the first forward mapping information into the IP address of the second physical network adapter; and
use the changed forwarding mapping as the second forward mapping information, and wherein the network handover notification comprises the IP address of the second physical network adapter.

16. The controller according to claim 13, wherein the processor-executable instructions further include instructions for the processor to send a handover indication to the terminal when a second handover condition is met, wherein the terminal sends the network handover notification according to the handover indication, and wherein the second handover condition comprises at least one of the following two conditions: a connection situation of the second network is better than that of the first network, or a network utilization rate of the second network is lower than a network utilization rate of the first network.

* * * * *